(12) United States Patent
Udaka

(10) Patent No.: US 7,483,116 B2
(45) Date of Patent: Jan. 27, 2009

(54) ELECTRICAL LIGHT CONTROL ELEMENT, LENS BARREL, AND IMAGING DEVICE

(75) Inventor: Toru Udaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 519 days.

(21) Appl. No.: 11/072,923

(22) Filed: Mar. 4, 2005

(65) Prior Publication Data

US 2005/0200774 A1    Sep. 15, 2005

(30) Foreign Application Priority Data

Mar. 10, 2004    (JP)    ............... P2004-066786

(51) Int. Cl.
*G02F 1/13* (2006.01)
(52) U.S. Cl. .................................................. 349/200
(58) Field of Classification Search .................. 349/95, 349/200–202, 152; 396/448
See application file for complete search history.

(56) References Cited

U.S. PATENT DOCUMENTS 5,721,986 A * 2/1998 Nomura et al. ............. 396/205
6,160,962 A * 12/2000 Nomura et al. ............. 396/277
6,847,428 B1 * 1/2005 Sekiguchi et al. ........... 349/139

FOREIGN PATENT DOCUMENTS

| JP | 49-096750 | 9/1974 |
|---|---|---|
| JP | 59-015278 | 1/1984 |
| JP | 60-241031 | 11/1985 |
| JP | 02-091607 | 3/1990 |
| JP | 2-91607 | 3/1990 |
| JP | 6-273790 | 9/1994 |
| JP | 06-273790 | 9/1994 |
| JP | 7-27983 | 1/1995 |
| JP | 07-027983 | 1/1995 |
| JP | 2001-519053 | 10/2001 |
| JP | 2004002126 | 1/2008 |

* cited by examiner

*Primary Examiner*—James A Dudek
(74) *Attorney, Agent, or Firm*—Bell, Boyd & Lloyd LLP

(57) ABSTRACT

The liquid crystal light control element includes the first to third transparent substrates which are placed on top of the other. The second transparent substrate has the projecting part which extends in the surface direction of the second transparent substrate from the first and third transparent substrates. The projecting part has the first surface facing the first transparent electrode and the second surface facing the fourth transparent electrode. The first surface has the first to fourth terminals formed thereon which are electrically connected to the first to fourth transparent electrodes.

3 Claims, 18 Drawing Sheets

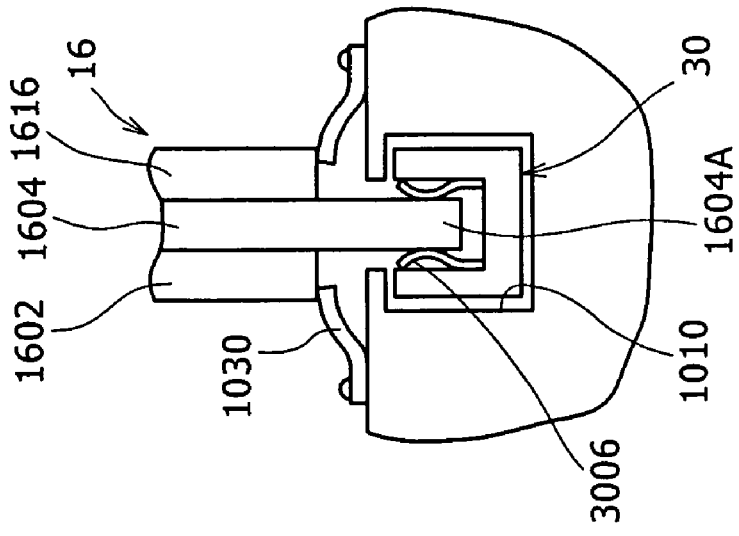
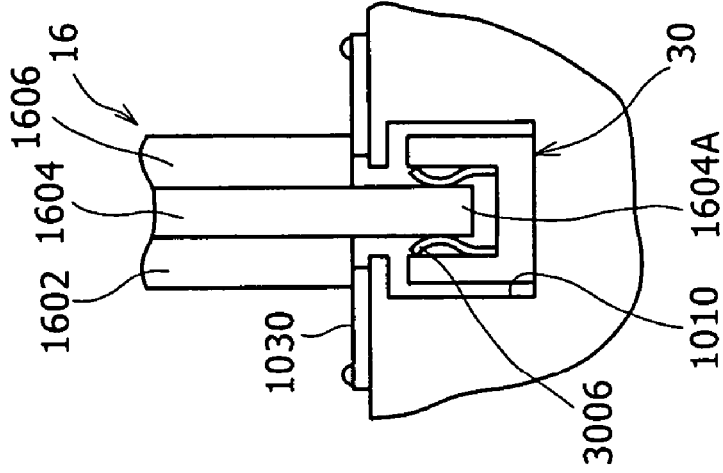
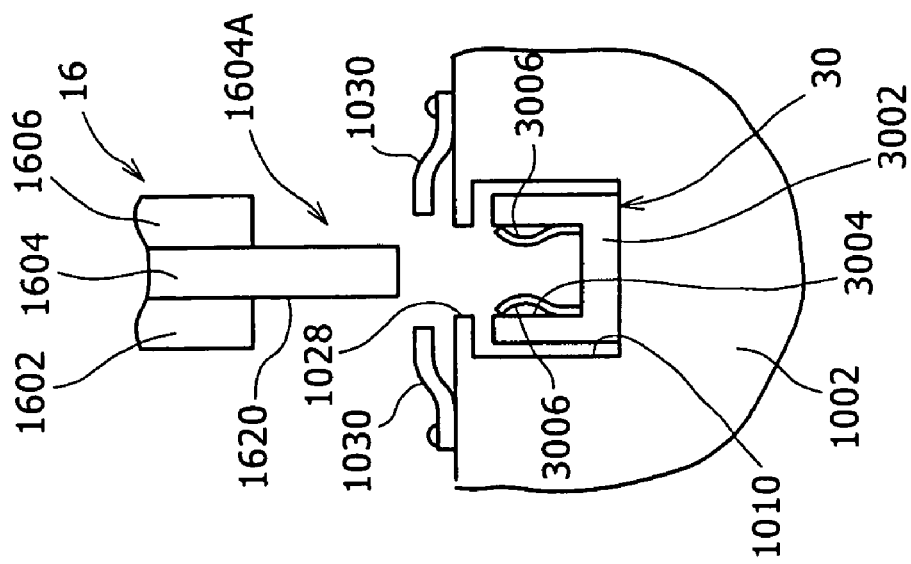

ELECTRICAL LIGHT CONTROL ELEMENT, LENS BARREL, AND IMAGING DEVICE

CROSS REFERENCE TO RELATED APPLICATIONS

The present application claims priority to Japanese Patent Document No. P2004-066786 filed on Mar. 10, 2004, the disclosure of which is herein incorporated by reference.

BACKGROUND OF THE INVENTION

The present invention relates to an electrical light control element, a lens barrel, and an imaging device.

The imaging device, such as digital camera and video camera, is provided with a lens barrel containing an optical system to lead the object image, an imaging device (such as CCD) aligned with the optical axis of the optical system, and a light control means for regulating the amount of light led to the imaging device, the light control means crosses the optical axis of the optical system.

The light control means is usually an iris diaphragm which mechanically adjusts the aperture. The iris diaphragm suffers the disadvantage of requiring iris blades and a mechanism to drive iris blades, which occupy a large space in the lens barrel. Therefore, the iris diaphragm is unfavorable to the size reduction of the lens barrel.

To tackle this problem, there has been proposed an imaging device provided with an electrical light control element which does not need a large space.

The known conventional electrical light control element has a liquid crystal layer consisting of a large number of rod-like liquid crystal molecules sealed therein such that they incline while keeping their long axes parallel to each other. The angle of inclination (with respect to the thickness direction of the liquid crystal layer) varies in proportion to the voltage applied to the light control element. See, Japanese Patent Laid-open No. 2002-82358.

In the electrical light control element mentioned above, the liquid crystal molecules permit more light to pass through as the angle of orientation of their long axes decreases with respect to the passage of light, resulting in an increased light transmittance. By contrast, the liquid crystal molecules permit less light to pass through as the angle of orientation of their long axes increases with respect to the passage of light, resulting in a decreased light transmittance.

SUMMARY OF THE INVENTION

On the other hand, there is a demand for an imaging device and a lens barrel which are small in size and simple to assemble. To meet this demand, the electrical light control element is also required to be small in size (occupying a less space) and to be easily built into the lens barrel.

The present invention was completed in view of the foregoing. The present invention in an embodiment provides an electrical light control element, a lens barrel, and an imaging device, which are favorable to size reduction and simple assembling.

The electric light control element according to an embodiment of the present invention has three or more transparent substrates extending parallel to each other at certain intervals, opposing transparent electrodes formed on the opposing surfaces of the transparent substrates, and light control layers each interposed between the opposing transparent electrodes, with the transparent substrates, transparent electrodes, and light control layer being placed on top of the other, each of the light control layers controlling the amount of light passing in the direction of the thickness of the light control layer which is the dimension of the opposing transparent electrodes, wherein the transparent substrate being at the intermediate position in the stacked state has a projecting part which projects in the surface direction of the transparent substrate from the other transparent substrate, and the projecting part has a plurality of terminals electrically connected to the transparent electrode of each of the transparent substrates.

The lens barrel according to an embodiment of the present invention includes a lens barrel main body which encloses an optical system leading the object image and an electrical light control element which is arranged on the optical axis of the optical system and supported by the lens barrel main body, the electrical light control element having three or more transparent substrates extending parallel to each other at certain intervals, opposing transparent electrodes formed on the opposing surfaces of the transparent substrates, and light control layers each interposed between the opposing transparent electrodes, with the transparent substrates, transparent electrodes, and light control layer being placed on top of the other, each of the light control layers controlling the amount of light passing in the direction of the thickness of the light control layer which is the dimension of the opposing transparent electrodes, such that the transparent substrate being at the intermediate position in the stacked state has a projecting part which projects in the surface direction of the transparent substrate from the other transparent substrate, and the projecting part has a plurality of terminals electrically connected to the transparent electrode of each of the transparent substrates.

The imaging device according to an embodiment of the present invention includes a lens barrel main body which encloses an optical system leading the object image, an imaging element to take a photograph of the object image led by the optical system, and an electrical light control element which is arranged on the optical axis of the optical system and between the optical system and the imaging element and supported by the lens barrel main body, the electrical light control element having three or more transparent substrates extending parallel to each other at certain intervals, opposing transparent electrodes formed on the opposing surfaces of the transparent substrates, and light control layers each interposed between the opposing transparent electrodes, with the transparent substrates, transparent electrodes, and light control layer being placed on top of the other, each of the light control layers controlling the amount of light passing in the direction of the thickness of the light control layer which is the dimension of the opposing transparent electrodes, such that the transparent substrate being at the intermediate position in the stacked state has a projecting part which projects in the surface direction of the transparent substrate from the other transparent substrate, and the projecting part has a plurality of terminals electrically connected to the transparent electrode of each of the transparent substrates.

The present invention produces the following effect. The electric light control element has three or more transparent substrates extending parallel to each other at certain intervals. The transparent substrate at the intermediate position in the stacked state has a projecting part which projects in the surface direction of the transparent substrate from the other transparent substrate, and the projecting part has a plurality of terminals electrically connected to the transparent electrode of each of the transparent substrates.

Therefore, a plurality of terminals are concentrically formed on the projecting part of the electric light control element. This is advantageous to miniaturizing and simplifying the structure to supply the drive voltage to each of the transparent electrodes and hence favorable to size reduction and cost reduction of the lens barrel and imaging device.

The object of size reduction and simple assembling is achieved by the electric light control element in which three or more transparent substrates extending parallel to each other at certain intervals and the transparent substrate at the intermediate position in the stacked state has a projecting part which projects in the surface direction of the transparent substrate from the other transparent substrate, and the projecting part has a plurality of terminals electrically connected to the transparent electrode of each of the transparent substrates.

Additional features and advantages of the present invention are described in, and will be apparent from, the following Detailed Description of the Invention and the figures.

BRIEF DESCRIPTION OF THE FIGURES

FIGS. 12A to 12C are diagrams illustrating what happens when the projecting part 1604A is inserted into the connector 30.

DETAILED DESCRIPTION OF THE INVENTION

The present invention relates to an electrical light control element, a lens barrel, and an imaging device.

Examples according to embodiments of the present invention will be described with reference to the accompanying drawings.

EXAMPLE 1

This example is concerned with the imaging device in which is incorporated the lens barrel of the present invention.

Figure 1:
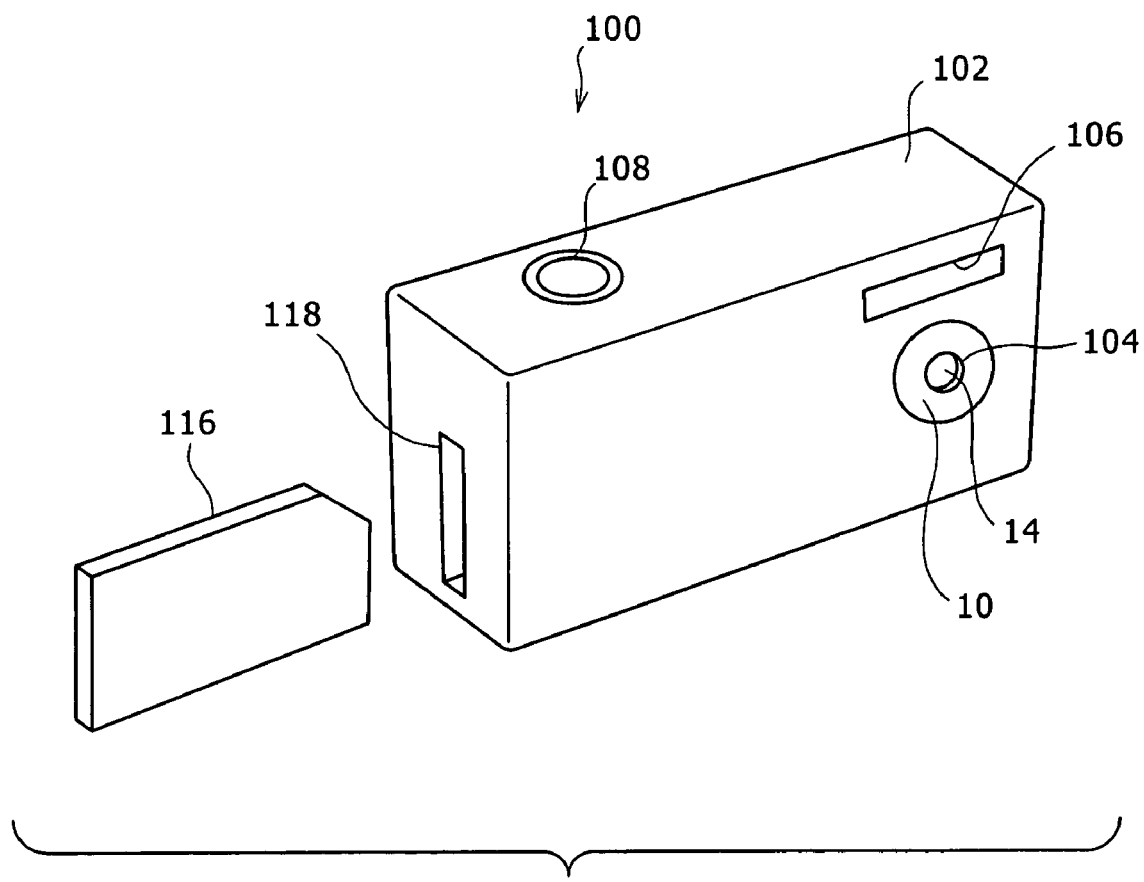
FIG. 1 is a front perspective view of the imaging device pertaining to Example 1.
Figure 2:
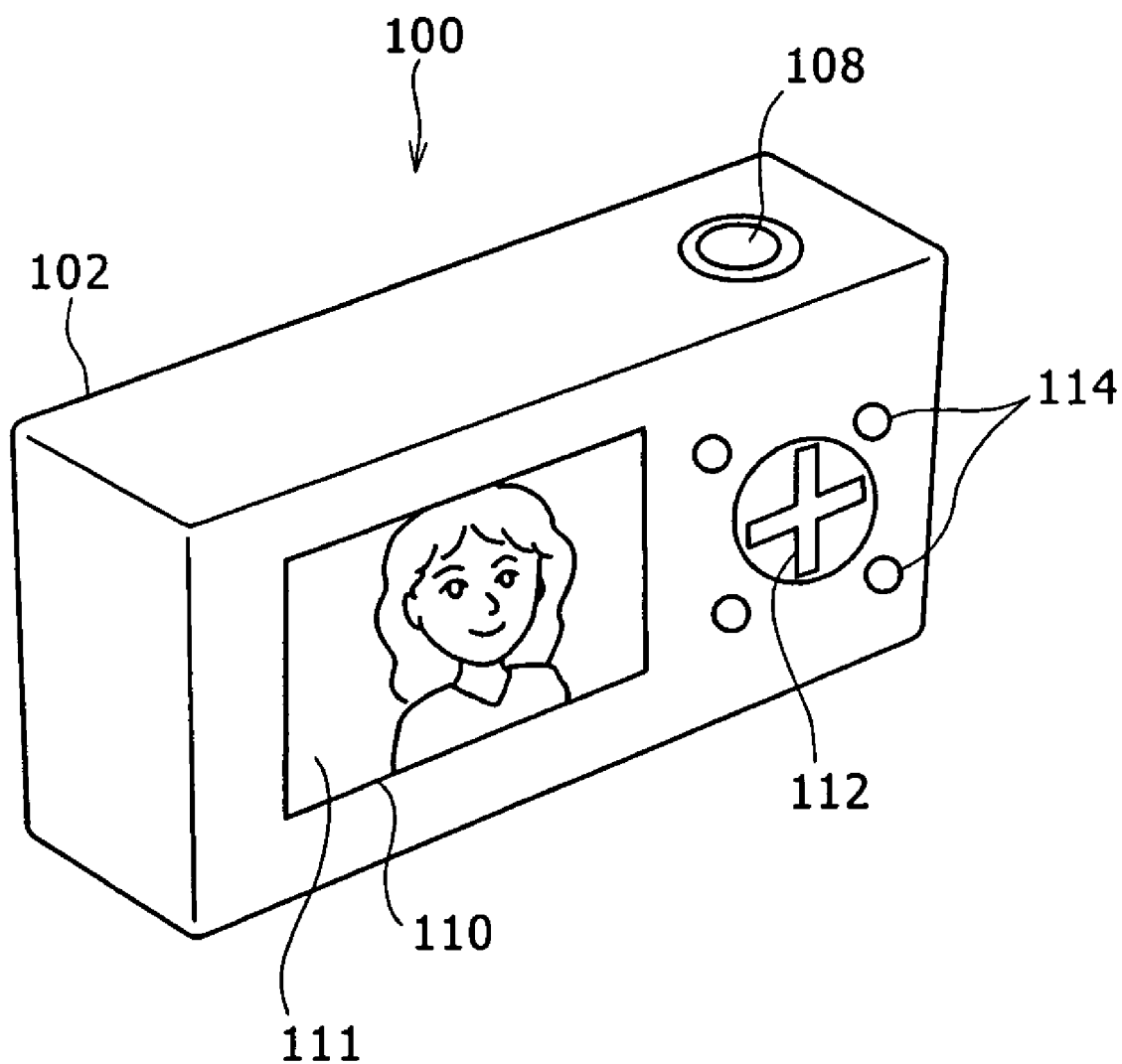
FIG. 2 is a rear perspective view of the imaging device pertaining to Example 1.
Figure 3:
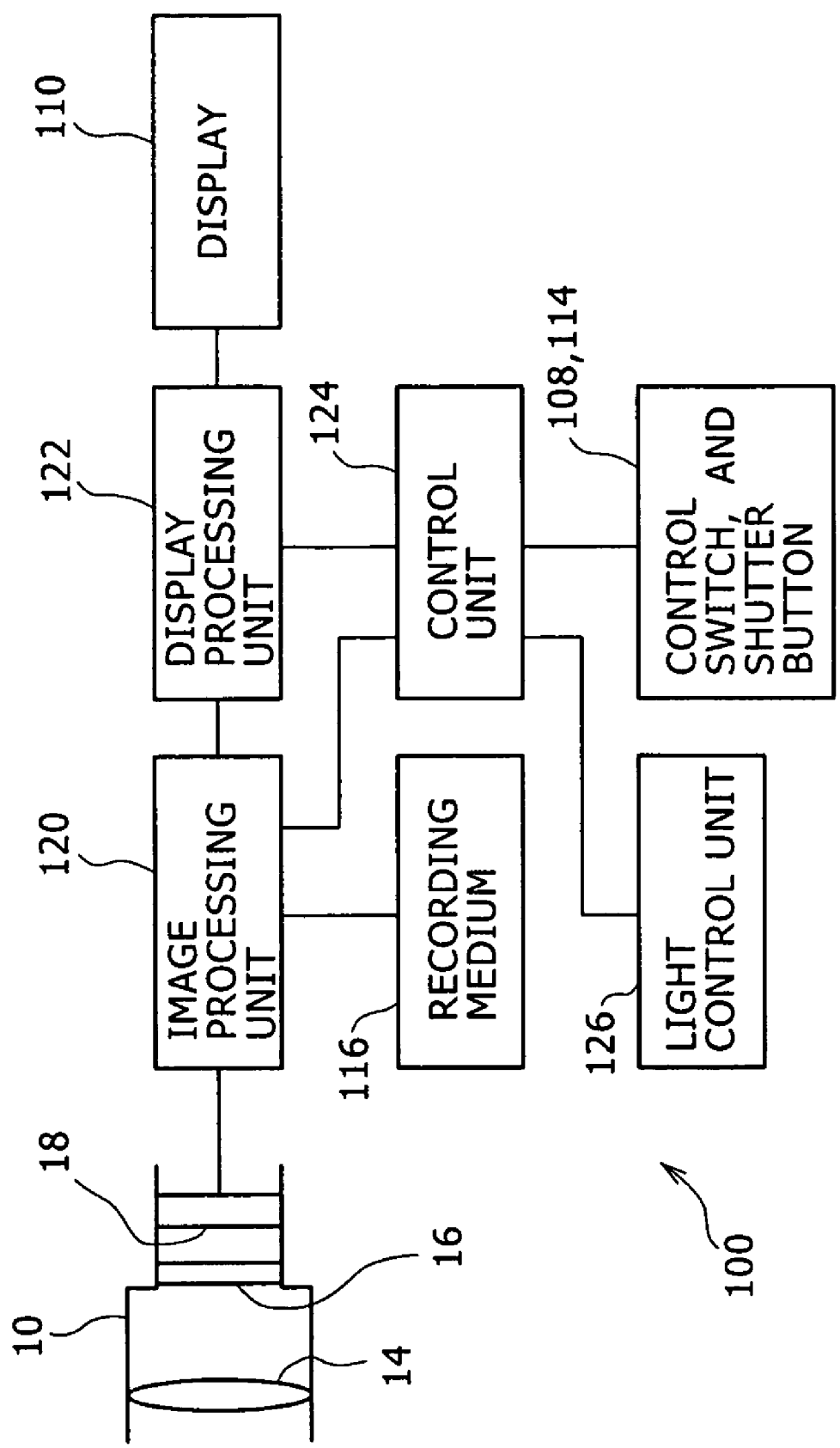
FIG. 3 is a block diagram showing the control system of the imaging device.
Figure 4:
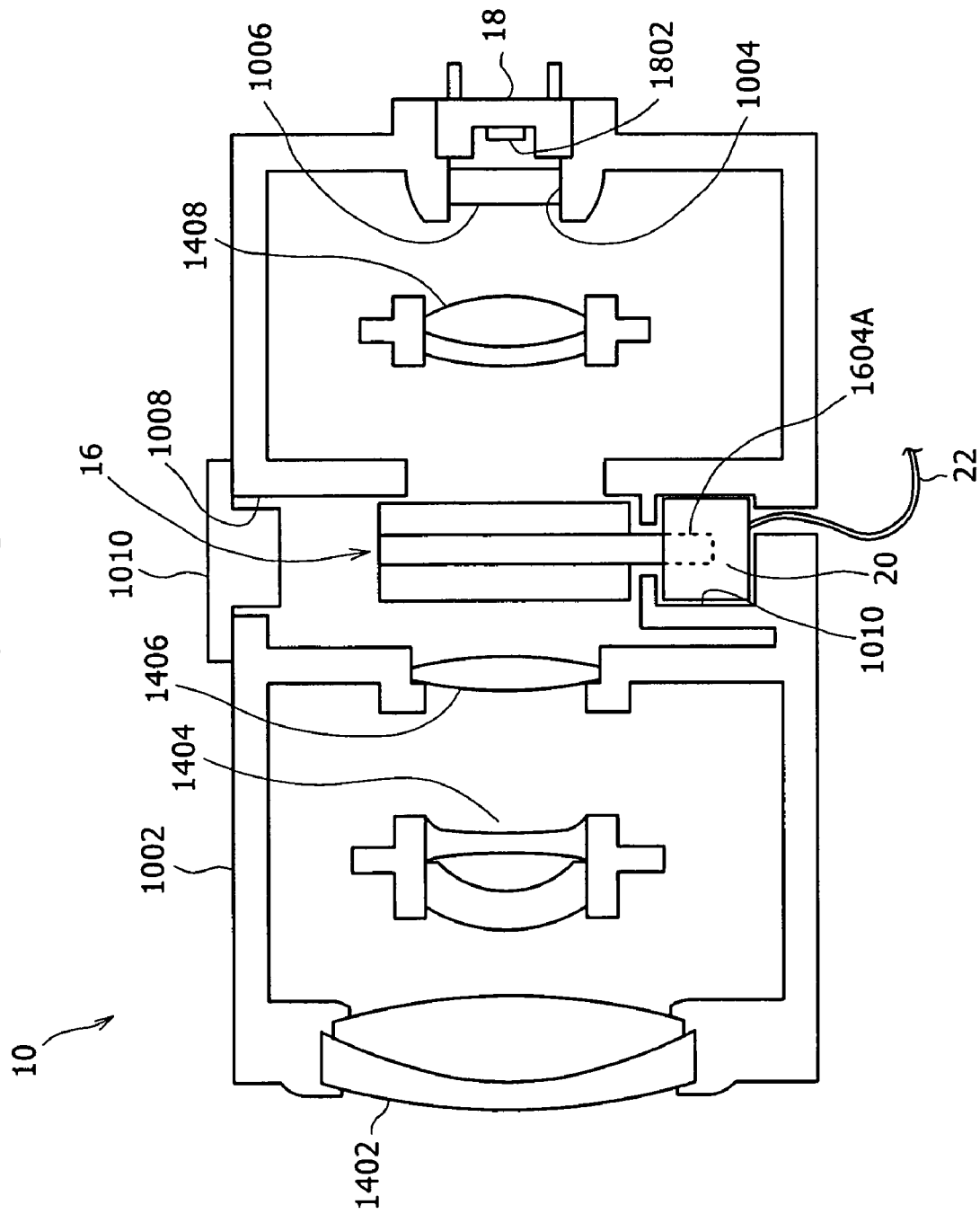
FIG. 4 is a schematic diagram showing the structure of the lens barrel.
Figure 5:
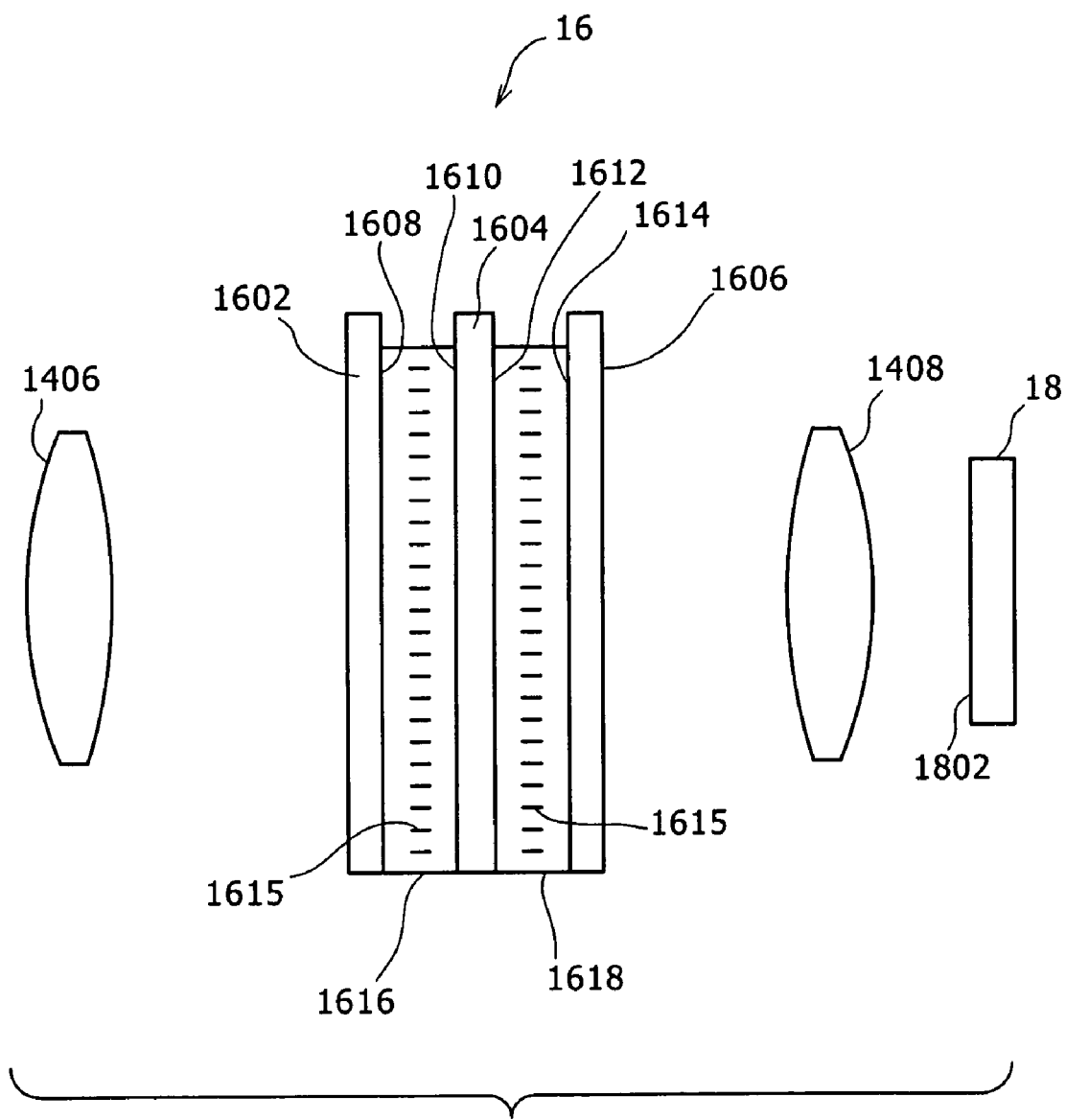
FIG. 5 is a diagram showing the structure of the optical system.
Figure 6:
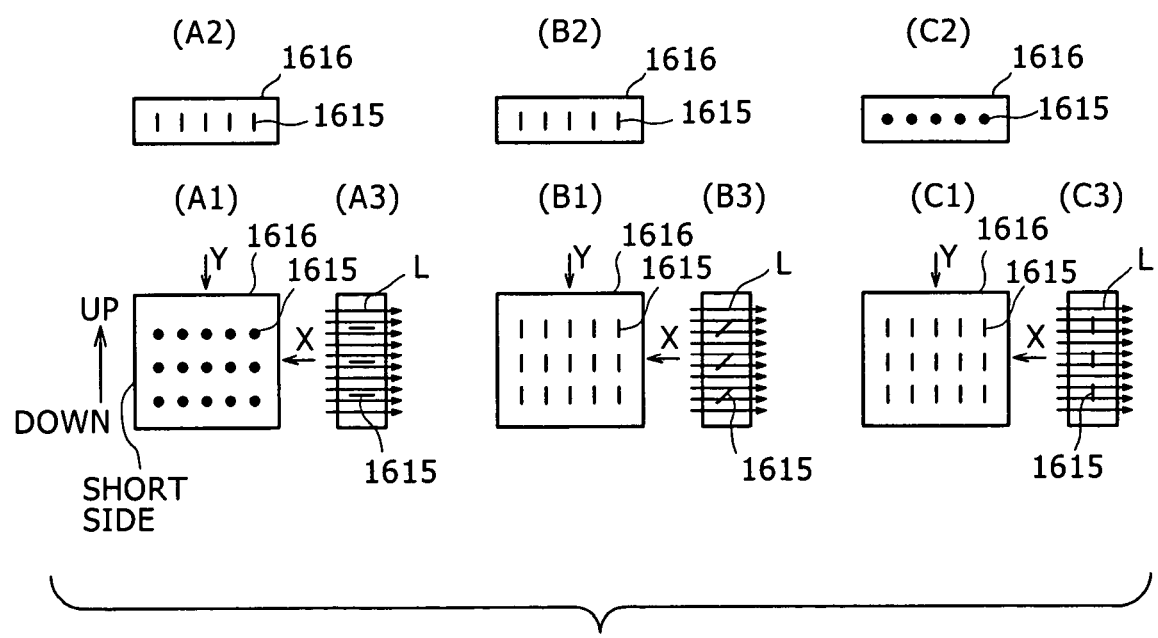
FIG. 6 is a diagram illustrating how the liquid crystal light control element 16 controls the light transmittance.

FIG. 1 is a front perspective view of the imaging device pertaining to Example 1. FIG. 2 is a rear perspective view of the imaging device pertaining to Example 1. FIG. 3 is a block diagram showing the control system of the imaging device. FIG. 4 is a sectional view showing the lens barrel. FIG. 5 is a schematic diagram showing the structure of the optical system. FIG. 6 is a diagram illustrating how the liquid crystal light control element 16 controls the amount of transmitted light.

The imaging device 100 shown in FIGS. 1 and 2 is a digital still camera with a rectangular casing 102. Incidentally, the terms "left" and "right" used in this specification respectively denote the left side and right side of the imaging device 100 as viewed from its front. Also, the terms "front" and "rear" respectively denote that side of the imaging device close to the object and the imaging element as viewed in the direction of the optical axis of the optical system.

As shown in FIG. 1, the imaging device 100 has a lens window 104 at its front right side and a lens barrel 10 through the lens window 104.

Above the lens window 104 is a flash 106 to generate fill-in light.

At the upper left side of the casing 12 is a shutter button 108.

On the rear side of the casing 12 are a liquid crystal display 110 (on which still or dynamic images and letters and symbols appear) as well as a cross switch 112 and a few control buttons 114 for operations.

On the left side of the casing 12 is a memory holder 118 which detachably holds a memory card 116 (recording medium) to record static and/or dynamic images.

As shown in FIG. 3, the lens barrel 10 consists of an optical system 14 (to lead the object image), an imaging element 18 (with an image plane which crosses the optical axis of the optical system 14), and a liquid crystal light control element 16 (corresponding to the electrical light control element as defined in the claims). Thus, the lens barrel 10 leads the object image captured by the optical system 14 to the imaging element 18 through the liquid crystal light control element 16.

The image taken by the imaging element 18 is converted into image signals to be output to the image processing unit 120, which creates the image data of the static and/or dynamic image according to the image signals. The image data is stored in the memory card 116 and processed by the display processing unit 122 for display on the display 110.

The liquid crystal light control element 16 is controlled by the driving voltage which is supplied from the light control unit 126.

In addition, the imaging device 100 has a control unit 124 (composed of CPU etc.) which controls the image processing unit 120 and the display processing unit 122 as the shutter button 108, the cross switch 112, and the control buttons are operated.

A description is given below of the lens barrel 10. As shown in FIG. 4, the lens barrel 10 is made up of the lens barrel main body 1002 and the following lenses arranged therein which constitute the optical system 14.

A first fixed lens 1402, a first movable lens 1404, a second fixed lens 1406, and a second movable lens 1408. These lenses are arranged in the order mentioned from front to rear in the direction of the optical axis.

In this example, the four-group inner focus lenses constitute the optical system 14. The first and second fixed lenses 1402 and 1406 are fixed to the lens barrel main body 1002, so that they do not move in the direction of the optical axis of the optical system 14. The first and second movable lenses 1404 and 1408 can be moved by a driving mechanism (not shown) in the direction of the optical axis of the optical system 14. The first movable lens 1404, which moves in the direction of the optical axis, functions as the zoom lens to adjust the focal length of the optical system 14. The second movable lens 1408, which moves in the direction of the optical axis, functions as the focusing lens to adjust the focusing position of the optical system 14. In other words, the first movable lens 1404 changes in response to its displacement the focal length, and the second movable lens 1408 corrects in response to its displacement the focusing position which varies according as the focusing length varies.

The lens barrel main body 1002 is a cylindrical or square hollow body. It has an opening 1004 at its rear end. The imaging element 18 is attached to the rear end of the lens barrel 1002 in such a way that the rectangular imaging plane 1802 faces the opening 1004. To the opening 1004 is attached the optical filter 1006 which allows passage of the light which has passed through the second movable lens 1408. The optical filter 1006 may be a low-pass filter or an infrared filter.

The lens barrel main body 1002 has an opening 1008 at its intermediate position between the second fixed lens 1406 and the second movable lens 1408. This opening 1008 is large enough to receive the liquid crystal light control element 16. At the opposite side of the opening 1008 is a connector 20 for connection to the liquid crystal light control element 16. The opening 1008 is closed by a closure 1010 after the liquid crystal light control element 16 has been inserted therein.

A description is given below of the liquid crystal light control element 16.

As shown in FIG. 5, the liquid crystal light control element 16 includes a first transparent substrate 1602, a second transparent substrate 1604, and a third transparent substrate 1606, which are parallel to each other a certain distance apart.

The first and second transparent substrates 1602 and 1604 have the first and second transparent electrodes 1608 and 1610 on their opposing surfaces, so that these transparent electrodes face each other.

The second and third transparent electrodes 1604 and 1606 have the third and fourth transparent electrodes 1612 and 1614 on their opposing surfaces, so that these transparent electrodes face each other.

Between the first and second transparent electrodes 1608 and 1610 is placed the first liquid crystal layer 1616 (corresponding to the light control layer defined in the claims). Between the third and fourth transparent electrodes 1612 and 1614 is placed the second liquid crystal layer 1618 (corresponding to the light control layer defined in the claims).

The first to third transparent substrates 1602, 1604, and 1606, the first to fourth transparent electrodes 1608, 1610, 1612, and 1614, and the first and second liquid crystal layers 1616 and 1618 are placed on top of the other.

The first liquid crystal layer 1616 controls the amount of light passing through it in its thickness direction in response to the voltage applied across the first and second transparent electrodes 1608 and 1610. The thickness of the first liquid crystal layer 1616 is determined by the distance between the two electrodes. The second liquid crystal layer 1618 controls the amount of light passing through it in its thickness direction in response to the voltage applied across the third and fourth transparent electrodes 1612 and 1614. The thickness of the second liquid crystal layer 1618 is determined by the distance between the two electrodes.

The first and second transparent electrodes 1608 and 1610 have the first and second alignment layers on their opposing surfaces. The first liquid crystal layer 1616 is sealed between the first and second alignment layers. The first liquid crystal layer 1616 contains rod-like liquid crystal molecules. The third and fourth transparent electrodes 1612 and 1614 have the third and fourth alignment layers on their opposing surfaces. The second liquid crystal layer 1618 is sealed between the third and fourth alignment layers. The second liquid crystal layer 1618 contains rod-like liquid crystal molecules.

The first and second liquid crystal layers 1616 and 1618 in the liquid crystal light control element 16 are of guest-host-type cell structure containing a host material and a guest material. The host material is composed of liquid crystal molecules 1615 and the guest material is composed of dichroic dye molecules.

Thus, the first liquid crystal layer 1616 controls the amount of light passing through it as the liquid crystal molecules 1615 change in the direction of orientation of their long axis in response to the voltage applied across the first and second transparent electrodes 1608 and 1610. The direction of orientation inclines with respect to the direction determined by the first and second alignment layers. The change in angle of inclination achieves the desired control. Similarly, the second liquid crystal layer 1618 controls the amount of light passing through it as the liquid crystal molecules 1615 change in the direction of orientation of their long axis in response to the voltage applied across the third and fourth transparent electrodes 1612 and 1614. The direction of orientation inclines with respect to the direction determined by the third and fourth alignment layers. The change in angle of inclination achieves the desired control.

A description is given below of the action of the liquid crystal light control element 16.

FIG. 6 illustrates the relation between the inclination of the long axis of liquid crystal molecules in the liquid crystal light control element 16 and the amount of light L passing through the liquid crystal light control element 16. Incidentally, FIG. 6 shows only the first liquid crystal layer 1616 for brevity.

The relation between the inclination of liquid crystal molecules 1615 and the amount of light L passing through the liquid crystal light control element 16 is analogous to that between the slats of a blind and the amount of light passing through the blind. In this example, the first liquid crystal layer 1616 is constructed such that the liquid crystal molecules orient in the plane approximately parallel to the short side of the image plane 1802 of the imaging element 18.

FIGS. 6(A1), 6(A2), and 6(A3) show how the liquid crystal molecules behave when the first liquid crystal layer 1616 is free of drive voltage E. FIG. 6(A1) is a diagram viewed from the front. FIG. 6(A2) is a diagram viewed in direction Y which is parallel to the plane in which liquid crystal molecules 1615 orient. FIG. 6(A3) is a diagram viewed in the direction X which is perpendicular to the direction Y.

It is to be noted that when the first liquid crystal layer 1616 is free of driving voltage E, liquid crystal molecules 1615 rest, with their long axis not inclined with respect to the thickness direction of the first liquid crystal layer 1616. With liquid crystal molecules 1615 orienting in such a direction, the first liquid crystal layer 1616 permits the maximum transmission of the incident rays L parallel to its thickness direction.

FIGS. 6(B13), 6(B2), and 6(B3), which are similar to FIGS. 6(A1), 6(A2), and 6(A3), show how the liquid crystal molecules behave when the first liquid crystal layer 1616 is excited at an intermediate drive voltage E.

It is to be noted that when the first liquid crystal layer 1616 is excited at an intermediate driving voltage E, liquid crystal molecules 1615 orient in such a way that their long axis inclines about 45° with respect to the thickness direction of the first liquid crystal layer 1616. With liquid crystal molecules 1615 orienting in such a direction, the first liquid crystal layer 1616 permits the intermediate transmission of the incident rays L parallel to its thickness direction.

FIGS. 6(C1), 6(C2), and 6(C3), which are similar to FIGS. 6(A1), 6(A2), and 6(A3), show how the liquid crystal molecules behave when the first liquid crystal layer 1616 is excited at a maximum drive voltage E.

It is to be noted that when the first liquid crystal layer 1616 is excited at a maximum driving voltage E, liquid crystal molecules 1615 orient in such a way that their long axis are perpendicular to the thickness direction of the first liquid crystal layer 1616. With liquid crystal molecules 1615 orienting in such a direction, the first liquid crystal layer 1616 minimizes the transmission of the incident rays L parallel to its thickness direction.

Thus, the liquid crystal light control element 16 as a whole produces the total transmittance which is the product of the transmittance of the first liquid crystal layer 1616 and the transmittance of the second liquid crystal layer 1618, because it is made up of the first to third transparent substrates 1602, 1604, and 1606, the first to fourth transparent electrodes 1608, 1610, 1612, and 1614, and the first and second liquid crystal layers 1616 and 1618, which are sequentially placed on top of the other.

A detailed description is given below of the structure of the liquid crystal light control element 16.

FIG. 7 is a perspective view showing the structure of the liquid crystal light control element 16, with (A) being viewed from front and (B) being viewed from rear. FIG. 8 is another perspective view showing the structure of the liquid crystal light control element 16.

As shown in FIG. 7, the first and third transparent substrates 1602 and 1606 assume a rectangular shape of the same size. The second transparent substrate 1604 also assumes a rectangular shape, with its short side equal to that of the rectangle and its long side larger than that of the rectangle.

The first and second transparent substrates 1602 and 1604 are bonded together such that they hold between them the first and second transparent electrodes 1608 and 1610, the first liquid crystal layer 1616, and the first and second alignment layers. They are bonded together such that one of the short sides of the first transparent substrate 1602 coincides with one of the short sides of the second transparent substrate 1604, and the long side of the first transparent substrate 1602 coincides with the long side of the second transparent substrate 1604.

The second and third transparent substrates 1604 and 1606 are bonded together such that they hold between them the third and fourth transparent electrodes 1612 and 1614, the second liquid crystal layer 1618, and the third and fourth alignment layers. They are bonded together such that one of the short sides of the second transparent substrate 1604 coincides with one of the short sides of the third transparent substrate 1606, and the long side of the second transparent substrate 1604 coincides with the long side of the third transparent substrate 1606.

The second transparent substrate 1604 has a projecting part 1604A that projects from the other short sides of the first and third transparent substrates 1602 and 1608.

In other words, the second transparent substrate 1604 in the middle has the projecting part 1604A that projects from the first and third transparent substrates 1602 and 1606 in the direction of its surface.

The projecting part 1604A has two surfaces; the first surface 1620 facing the first transparent electrode 1608 (the first transparent substrate 1602) and the second surface 1622 facing the fourth transparent electrode 1614 (the third transparent substrate 1606). On the first surface are arranged the first to fourth terminals 1624, 1626, 1628, and 1630, which are electrically connected respectively to the first to fourth transparent electrodes 1608, 1610, 1612, and 1614. These terminals are equally spaced along the short side of the projecting part 1604.

Figure 7A:
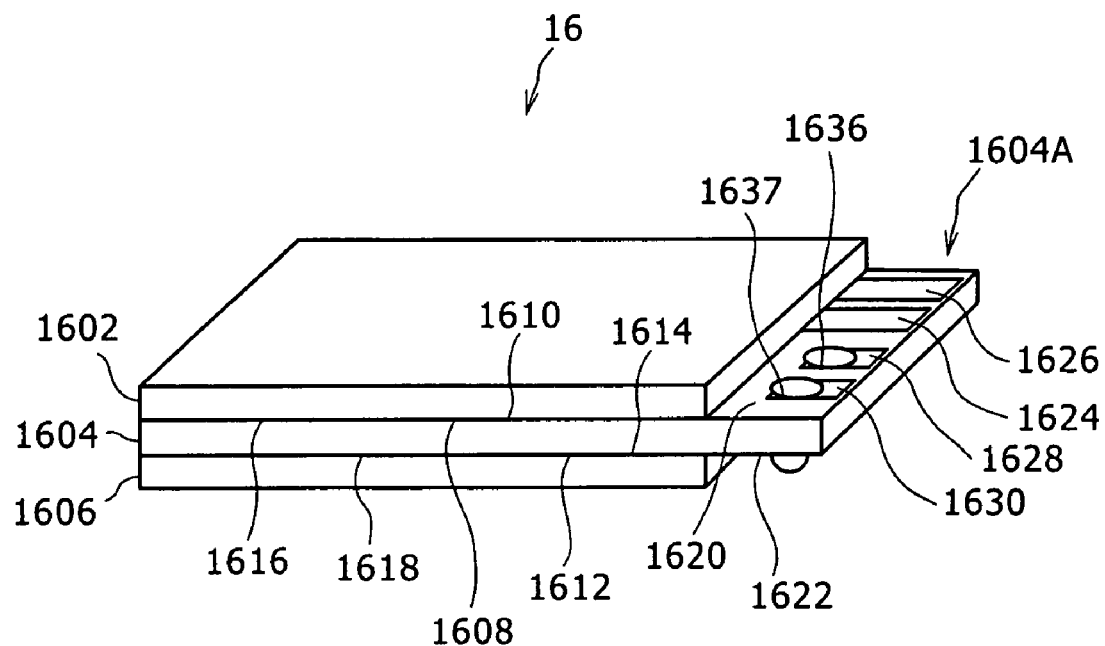
FIGS. 7A and 7B are perspective views showing the structure of the liquid crystal light control element 16.
Figure 8:
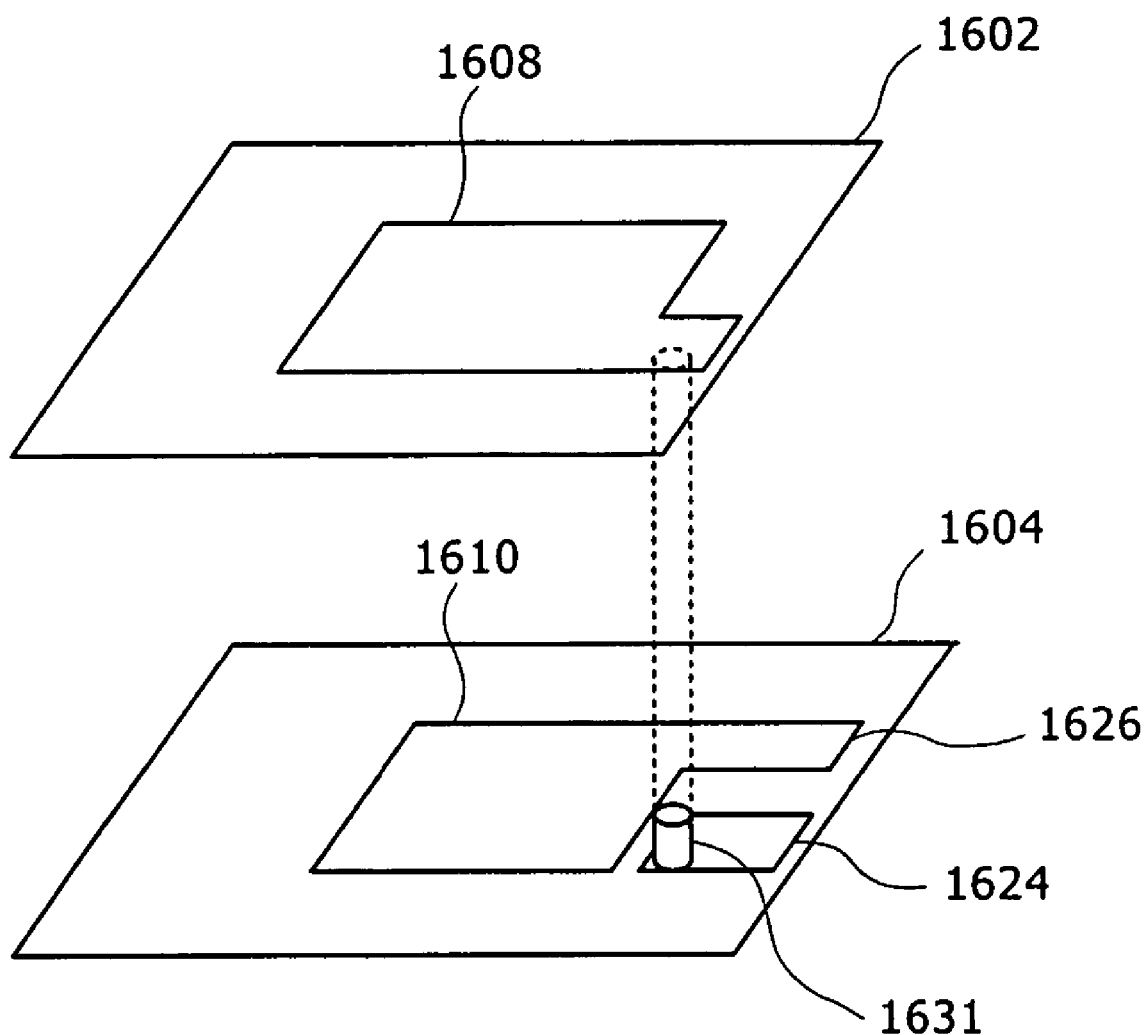
FIG. 8 is a perspective view showing the structure of the liquid crystal light control element 16.

As shown in FIGS. 7(A) and 8, the first connecting terminal 1624 is electrically connected to the first transparent electrode 1608 through the conducting material 1631 which extends from the second transparent substrate 1604 in the thickness direction of the first liquid crystal layer 1616. The second connecting terminal 1626 is electrically connected to the second transparent electrode 1610 on the second transparent substrate 1604.

Figure 7B:
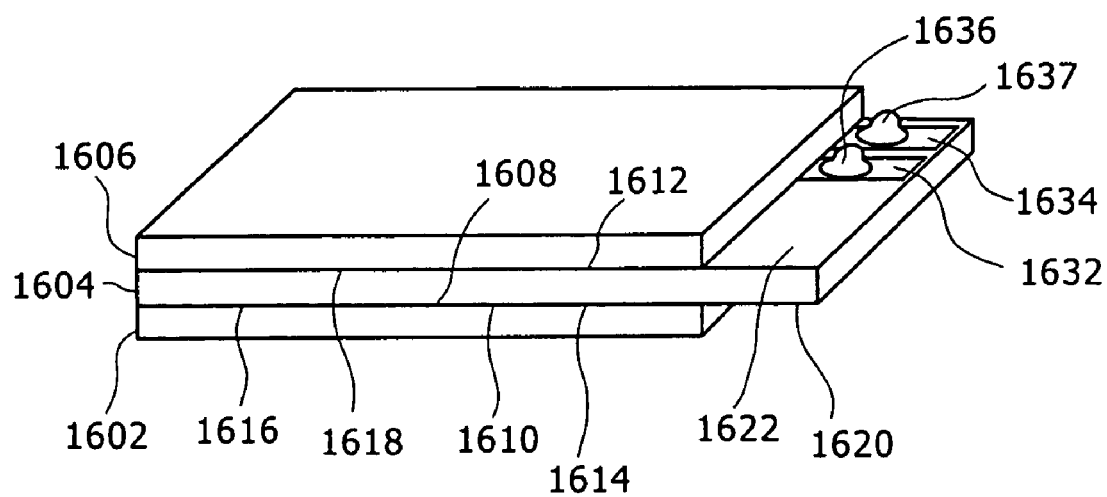

As shown in FIG. 7(B), the third terminal 1628 is electrically connected to the third transparent electrode 1612 through the conducting material and the first intermediate wiring 1632. The conducting material 1636 is formed in the through-hole penetrating the projecting part 1604A from its first surface 1620 to its second surface 1622. The conducting material 1636 has one end connected to the third terminal 1628 and the other end connected to the first intermediate wiring 1632. The first intermediate wiring 1632 is electrically connected to the third transparent electrode 1612 which is formed on the second surface 1622.

The fourth terminal 1630 is electrically connected to the fourth transparent electrode 1614 through the conducting material 1637 (different from the conducting material 1636) and the second intermediate wiring 1634. The conducting material 1637 is formed in the through hole penetrating the projecting part 1604A from its first surface 1620 to its second surface 1622. The conducting material 1637 has one end connected to the fourth terminal 1630 and the other end connected to the second intermediate wiring 1634. The second intermediate wiring 1634 is electrically connected to the fourth transparent electrode 1614 which is formed on the second surface 1622 and extends from the second transparent electrode 1604 in the thickness direction of the second liquid crystal layer 1618, as in the same way as shown in FIG. 8.

The through hole may penetrate either or both of the third terminal 1628 and the first intermediate wiring 1632. Alternatively, it may penetrate the projecting part 1604A on which the third terminal 1628 and the first intermediate wiring 1632 are not formed. Or, it may penetrate either or both of the fourth terminal 1630 and the second intermediate wiring 1634. Or, it may penetrate the projecting part 1604A on which the fourth terminal 1630 and the second intermediate wiring 1634 are not formed.

According to an embodiment of the present invention, the first to third transparent substrates 1602, 1604, and 1606 may be formed from glass or transparent polymer resin.

The through hole in the second transparent substrate 1604 may be formed therein by laser beam machining, chemical etching, dry etching, or mechanical drilling.

The conducting materials 1636 and 1637 may be one which is composed of an electrically conductive material and a resinous material enclosing it.

The electrically conductive material may be selected from gold, platinum, silver, copper, aluminum, tungsten, tin, or ITO (tin doped with indium oxide). They may be used alone or in combination with one another.

The resinous material may be selected from thermosetting resin, UV curable resin, two-pack reaction-curable resin, or dry-curable resin. Other resinous materials include epoxy resin, acrylic resin, polyalkyloxide resin, and elastomer.

The electrically conductive materials 1636 and 1637 may be conducting film formed in the through hole by electroless plating.

A description is given below of the connector 20.

Figure 9:
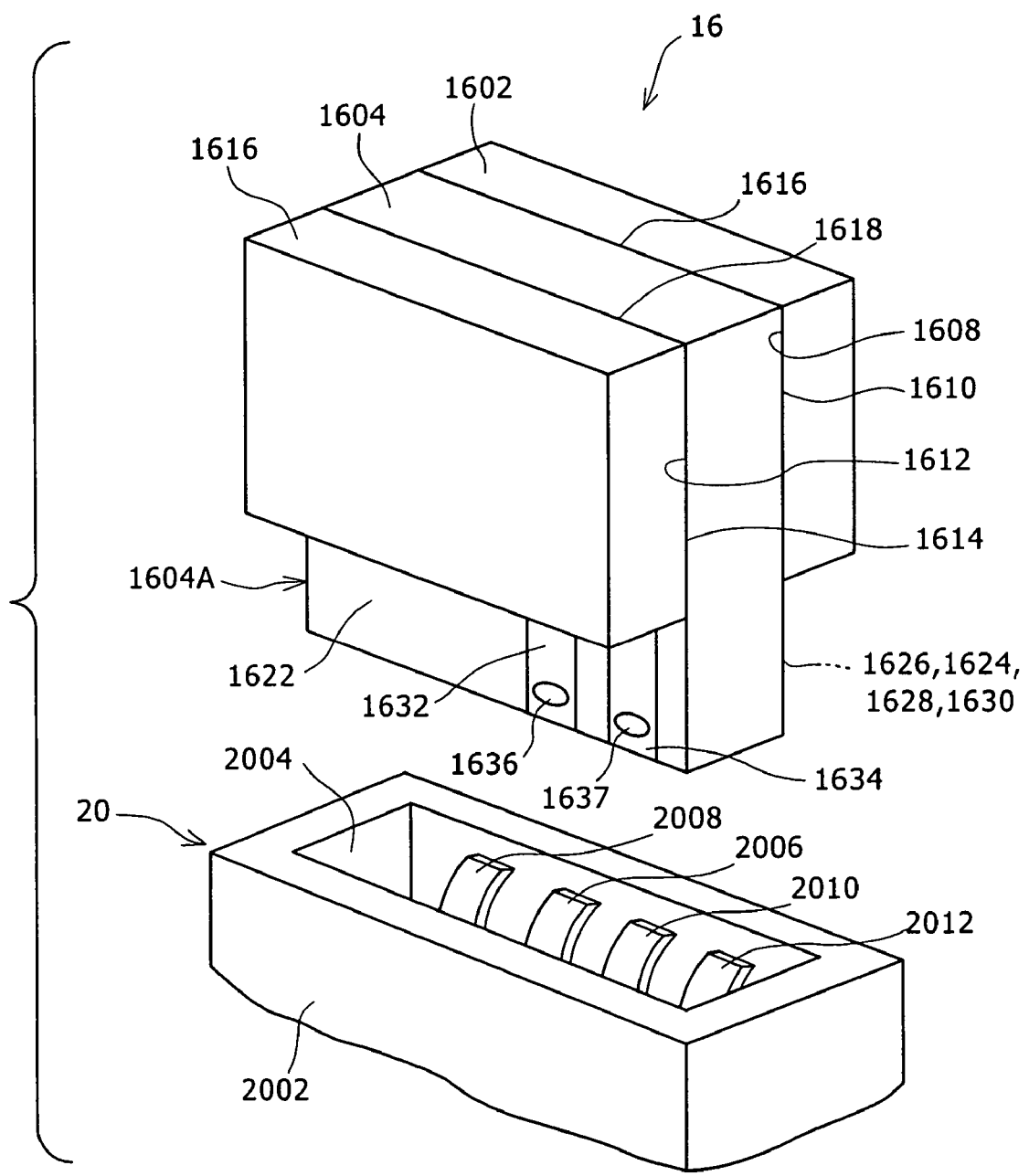
FIG. 9 is a perspective view showing the structure of the connector 20.

FIG. 9 is a perspective view showing the structure of the connector 20.

As shown in FIGS. 4 and 9, the connector 20 includes the connector main body 2002 which is held in the connector holder 1010 attached to the lens barrel 1002.

The connector main body 2002 has a rectangular connecting surface having short sides and long sides. The connecting surface has an engaging concave part 2004 along the long side of the rectangle. On the lateral surface of the engaging concave part 1004 are formed the first to fourth connecting pieces 2006, 2008, 2010, and 2012 at certain intervals.

The engaging concave part 2004 is constructed such that the projecting part 1604A is detachably inserted and the projecting part 1604A is held therein once it has been inserted.

When the projecting part 1604A is inserted into the engaging concave part 2004, the projecting part 1604A is held by the connector 20, and the first to fourth terminals 1624, 1626, 1628, and 1630 on the projecting part 1604A are electrically connected to the first to fourth connecting pieces 2006, 2008, 2010, and 2012.

As shown in FIG. 4, the first to fourth connecting pieces 2006, 2008, 2010, and 2012 of the connector 20 are connected to the light control unit 126 through the flexible substrate 22. While the projecting part 1604A is inserted into the engaging concave part 2004, the driving voltage (which is supplied from the light control unit 126) is applied to the first to fourth transparent electrodes 1608, 1610, 1612, and 1614 through the first to fourth terminals 1624, 1626, 1628, and 1630.

As mentioned above, the liquid crystal light control element 16 pertaining to Example 1 is constructed as follows. The first to third transparent substrates 1602, 1604, and 1606 are arranged on top of the other. The second transparent substrate 1604 has the projecting part 1604A which projects (in the direction along the surface of the second transparent substrate 1604) from the first and third transparent substrates 1602 and 1606. The projecting part 1604A has the first to fourth terminals 1624, 1626, 1628, and 1630, which are electrically connected to the first to fourth transparent electrodes 1608, 1610, 1612, and 1614 of the first to third transparent electrodes 1602, 1604, and 1606.

Thus, the first to fourth terminals 1624, 1626, 1628, and 1630 are concentrated at the projecting part 1604A of the liquid crystal light control element 16. This structure is small and simple to supply the drive voltage to the four transparent electrodes 1608, 1610, 1612, and 1614. Such a small and simple structure is favorable to reducing the size and cost of the lens barrel 10 and imaging device 100.

If all the terminals 1624, 1626, 1628, and 1630 of the four transparent electrodes 1608, 1610, 1612, and 1614 are formed on the projecting part 1604A as in Example 1, the result is favorable to the smaller and simpler structure to supply the drive voltage to the four transparent electrodes 1608, 1610, 1612, and 1614.

Even in the case where the connector 20 (which detachably holds the projecting part 1604A) is formed, the connector 20 can be made small in size as in Example 1 and the liquid crystal light control element 16 can be built into the lens barrel 10 simply by connecting the connector 20 to the liquid crystal light control element 16. This is favorable to simplifying the assembling procedure.

In this case, the projecting part 1604A can be formed such that it projects from the second transparent substrate held between adjacent transparent substrates, and the projecting part 1604A can be supported by the connector 20. This is favorable to stably supporting the liquid crystal light control element.

Moreover, according to Example 1, all the terminals are formed on the first surface 16020 of the projecting part 1604A; therefore, it is only necessary to form the connecting pieces of the connector 40 only on one side of the engaging concave part 2004. This is favorable to simplifying the connector 40.

Incidentally, it has been mentioned above that the first to third transparent substrates 1602, 1604, and 1606 may be formed from glass or transparent polymer resin. However, at least one of the three transparent substrates 1602, 1604, and 1606 may be an optical filter (low-pass filter or infrared filter).

In this case, it is possible to eliminate the optical filter 1006 placed in front of the imaging element 18. This is favorable to reducing the size and reducing the number of parts.

EXAMPLE 2

Example 2 differs from Example 1 in the structure of the connector 30.

Figure 10:
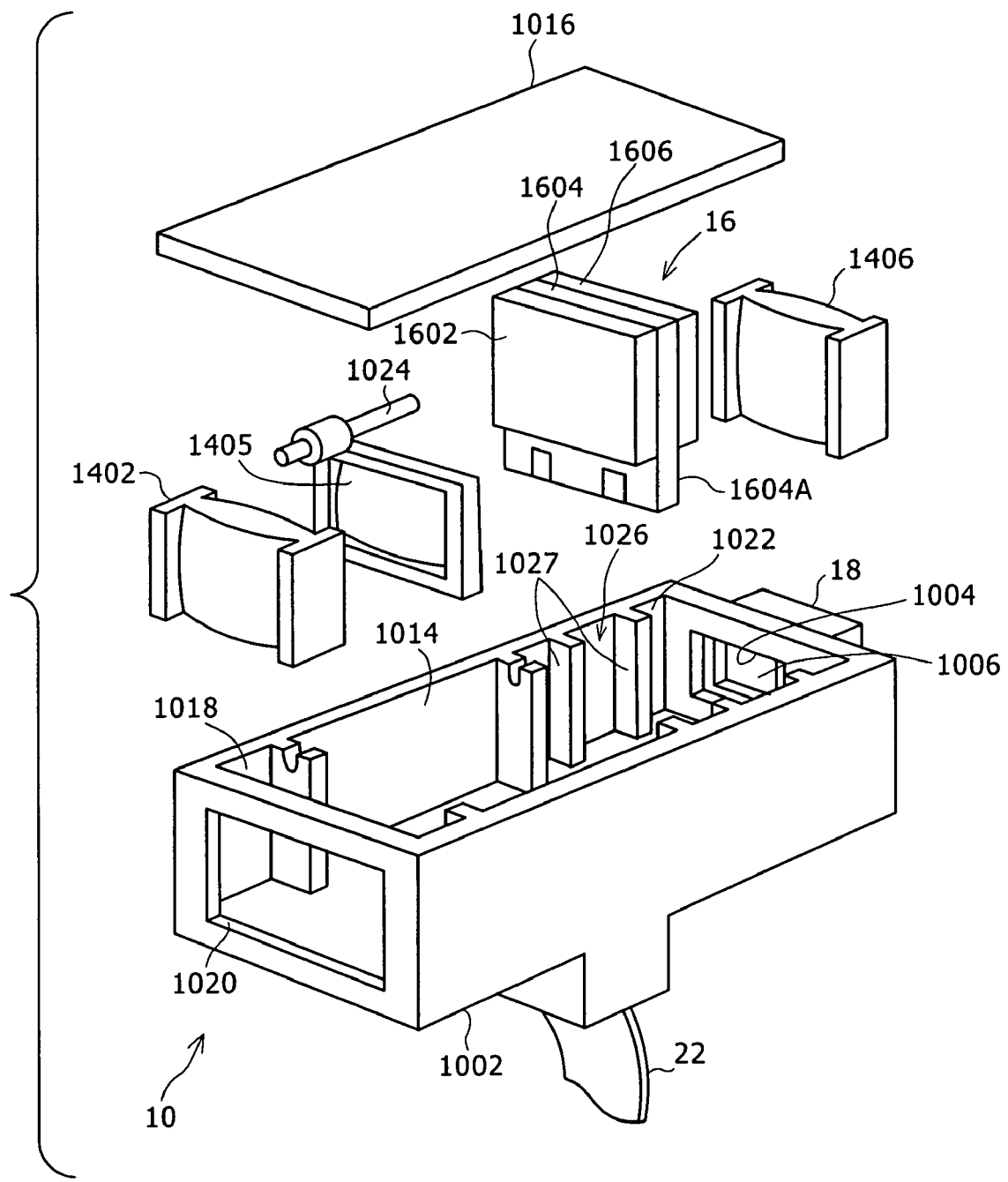
FIG. 10 is a cut-away perspective view of the lens barrel 10 pertaining to Example 2.
Figure 11:
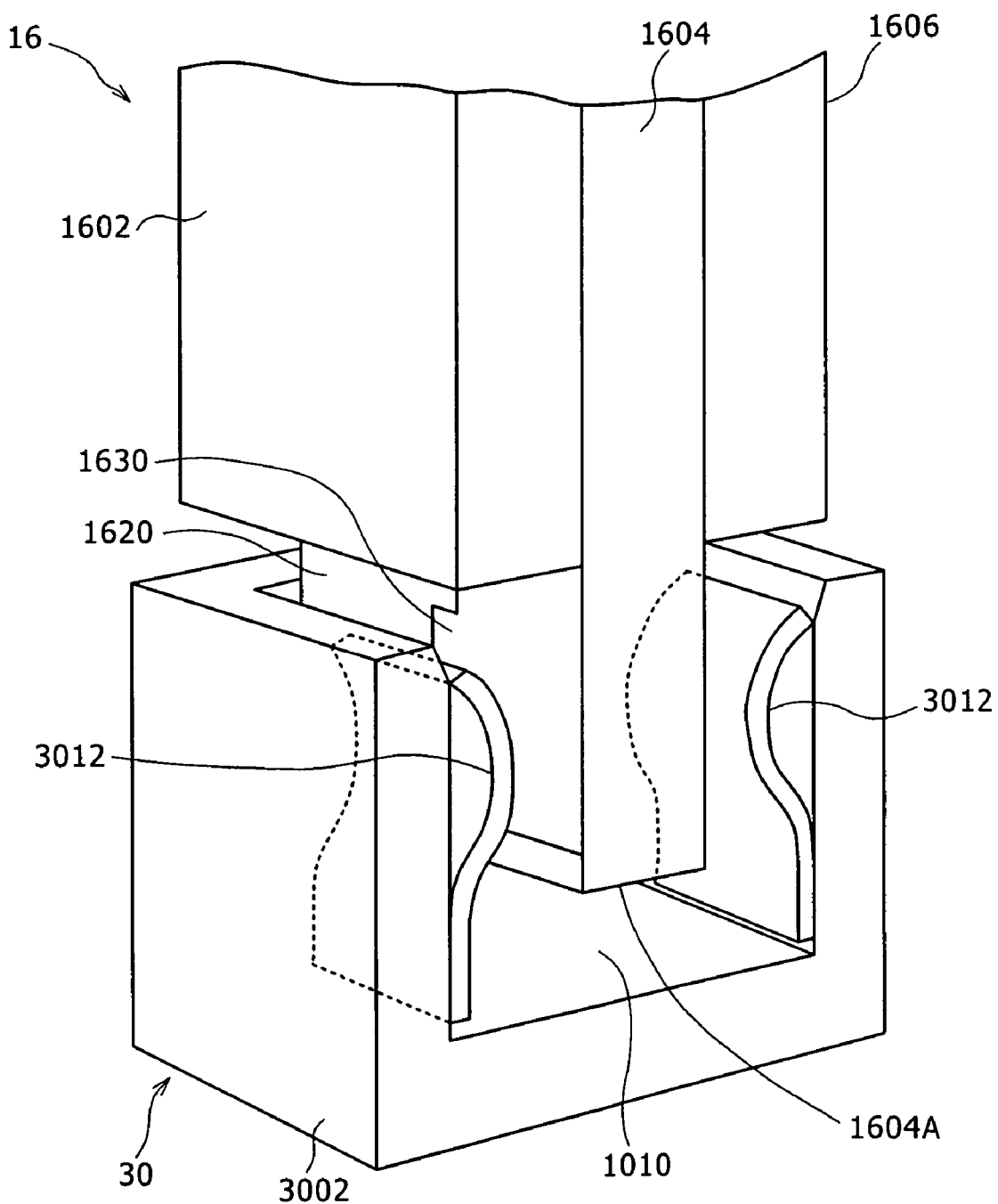
FIG. 11 is a diagram illustrating how the projecting part 1604A is held by the connector 30.

FIG. 10 is a cut-away perspective view of the lens barrel 10 pertaining to Example 2. FIG. 11 is a diagram illustrating how the projecting part 1604A is held by the connector 30. FIG. 12 is a diagram illustrating what happens when the projecting part 1604A is inserted into the connector 30. Incidentally, in the following examples, the same parts as those in Example 1 are given the same symbols.

As shown in FIG. 10, the lens barrel 10 is framed by the lens barrel main body 1002, in which is installed the optical system 14. The optical system 14 is made up of the first fixed lens 1402, the movable lens 1405, and the second fixed lens 1406, which are sequentially arranged from front to rear in the optical axis.

In this example, the optical system 14 has three groups of inner focusing lenses. The first and second fixed lenses 1402 and 1406 are fixed to the lens barrel main body so that they do not move in the direction of the optical axis. The movable lens 1405 is movable in the direction of the optical axis 14 by the moving mechanism (not shown). The movable lens 1405 (which functions as the focusing lens) adjusts the focal point of the optical system 14 as it moves in the direction of the optical axis.

To be concrete, the lens barrel main body 1002 is a rectangular parallelepiped elongating in the direction of the optical axis of the optical system 14. It has an upper opening 1014 which is closed by the lid 1016.

At the front side of the lens barrel main body 1002 is the first lens support 1018, which holds the first fixed lens 1402 to prevent it from moving in the direction of the optical axis and in the direction perpendicular to the optical axis. (The first fixed lens 1402 is inserted into the lens support 1018 through the opening 1014.) At the front end of the lens barrel main body 1002 is a window 1030 facing the object, and at the rear end of the lens barrel main body 1002 is an opening 1004 through which the imaging element 18 receives the object light.

At the rear side of the lens barrel main body 1002 is the second lens support 1022, which holds the second fixed lens 1406 to prevent it from moving in the direction of the optical axis and in the direction perpendicular to the optical axis. (The second fixed lens 1406 is inserted into the lens support 1022 through the opening 1014.)

The movable lens 1405 is placed between the first and second fixed lenses 1402 and 1406. It is slidably connected to the guide axis 1024 which rests on the first and second lens supports 1018 and 1022, so that it is movable in the direction of the optical axis.

The liquid crystal light control element 16 is of the same structure as that in Example 1. It is placed between the movable lens 1405 and the second fixed lens 1406.

At the front side of the second lens support 1022 in the lens barrel main body 1002 is the transparent substrate support 1026 which holds the liquid crystal light control element 16 to prevent it from moving in the direction of the optical axis. (The liquid crystal light control element 16 is inserted into the support 1026 through the opening 1014.) The transparent substrate support 1026 is made up of two engaging ribs 1027, which come into contact with the edge of the outer surface of the first transparent substrate 1602 and the edge of the outer surface of the third transparent substrate 1606.

As shown in FIG. 12, at that part of the bottom of the lens barrel main body 1002, which corresponds to the transparent substrate support 1026, is the connector holder 1010 through the opening 1028.

There are two spring members 1030 at two places which hold the opening 1028 (in the direction of the optical axis) at the bottom of the lens barrel main body 1002. The spring members 1030 come into contact with the ends of the first and third transparent substrates 1602 and 1606 when the projecting part 1604A of the liquid crystal light control element 16 is inserted into the connector 30. In this state, the spring members 1030 apply a force to the liquid crystal light control element 16 to move it away from the connector in the direction perpendicular to the optical axis.

As shown in FIG. 12, the connector 30 is framed in the main body 3002 which is held in the connector holding part 1010. The connector holding part 1010 has a slightly larger space than the main body 3002, so that it permits the main body 3002 to move therein in the direction of the optical axis or in the direction perpendicular to the optical axis.

The main body 3002 has rectangular connecting surfaces, on each of which is formed (along the long side of the rectangle) an engaging concave part 3004. On the engaging concave part 3004 are arranged the first to fourth pairs of elastic pieces 3006, 3008, 3010, and 3012. The intervals between the first to fourth elastic pieces 3006, 3008, 3010, and 3012 are smaller than the thickness of the projecting part 1604A. This constitution permits the projecting part 1604A to be detachably fitted into the engaging concave part 3004, so that the projecting part 1604A is held once it has been inserted into the engaging concave part 3004.

One of each pair of the elastic pieces 3006, 3008, 3010, and 3012 is made of an electrically conductive material, so that the elastic pieces 3006, 3008, 3010, and 3012 are electrically connected to the first to fourth terminals 1624, 1626, 1628, and 1630.

As shown in FIG. 10, the half of the first to fourth elastic pieces 3006, 3008, 3010, and 3012 are connected to the light control unit 126 through the flexible substrate 22, so that the drive voltage (which is supplied from the light control unit 126) is applied to the first to fourth transparent electrodes 1608, 1610, 1612, and 1614 through the first to fourth terminals 1624, 1626, 1628, and 1630, respectively, while the projecting part 1604A is inserted into the engaging concave part 3004.

According to Example 2, the liquid crystal light control element 16 is inserted into the connector 30 as follows. As shown in FIG. 10, the liquid crystal light control element 16 is inserted into the transparent substrate support 1026 through the opening 1014 of the lens barrel main body 1002. Then, as shown in FIG. 12(A), the projecting part 1604A of the liquid crystal light control element 16 is inserted into the engaging concave part 3004 of the connector 30. In this state, the projecting part 1604A is held between the first to fourth pairs of elastic pieces 3006, 3008, 3010, and 3012.

Now, the main body 3002 of the connector 30 is movable together with the projecting part 1064A in the connector holder 1010. As shown in FIG. 12(B), the liquid crystal light control element 16 is inserted further, so that the spring member 1030 comes into contact with the edge surface of the first and third transparent substrates 1602 and 1606. In this state, the spring member 1030 becomes flat due to elastic deformation.

Next, the liquid crystal light control element 16 is released from the inserting force. In this state, as shown in FIG. 12(C), the liquid crystal light control element 16 is moved by the spring member 1030 in the direction in which it gets away from the connector 30. The direction of movement is perpendicular to the optical axis. The main body 3002 also moves in the direction perpendicular to the optical axis because the main body 3002 of the connector 30 is integral with the projecting part 1604A. Therefore, the main body 3002 floats in the connector holder 1010 without touching anything.

Example 2 produces the same effect as Example 1. It also produces an additional effect as follows. Even if the lens barrel 1002 receives a stress, the connector 30 is exempt from a stress because the main body 3002 is floating in the connector holder 1010.

Therefore, the projecting part 1604A is relieved from undue force from the connector 30 and the liquid crystal light control element 16 is protected from a local stress which might disturb the orientation of liquid crystal molecules. This ensures the light control actions.

EXAMPLE 3

Example 3 differs from Example 1 in the arrangement of terminals of the liquid crystal light control element 16 and also in the structure of the connector 40.

Figure 13A:
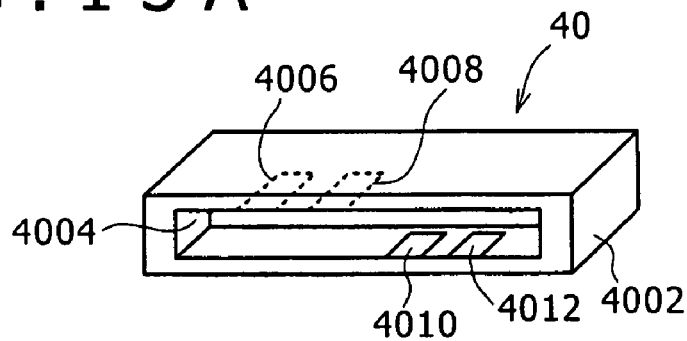
FIGS. 13A to 13C are perspective views showing the connector 40 and the liquid crystal light control element 16 pertaining to Example 3.
Figure 13B:
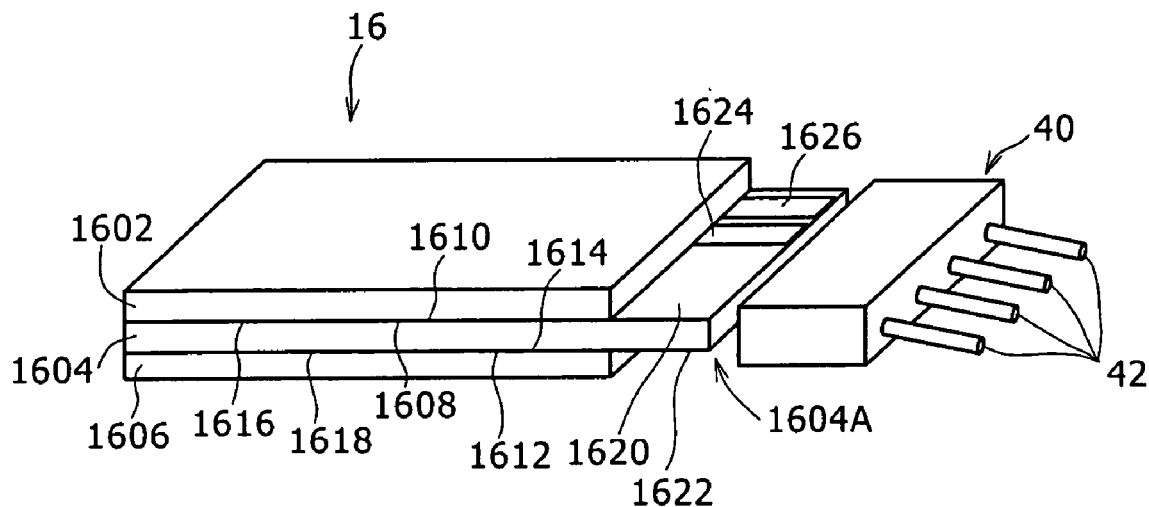
Figure 13C:
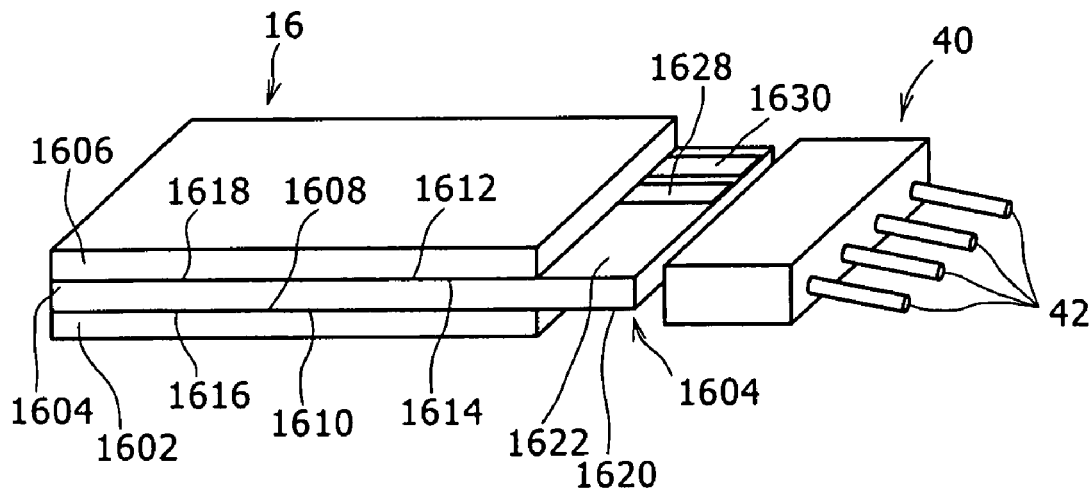

FIG. 13(A) is a perspective view of the connector 40 in Example 3. FIG. 13(B) is a perspective view of the liquid crystal light control element 16 viewed in its thickness direction from its front. FIG. 13(C) is a perspective view of the liquid crystal light control element 16 viewed in its thickness direction from its rear.

In FIG. 3, as shown in FIGS. 13(B) and 13(C), the first terminal 1624 and the second terminal 1626 are formed on the first surface 1620 of the projecting part 1604A facing the first transparent substrate 1602, and the third terminal 1628 and the fourth terminal 1630 are formed on the second surface of the projecting part 1604A facing the third transparent substrate 1606.

There are no through holes and conducting materials as in Example 1; the first terminal 1624 is electrically connected to the first transparent electrode 1608 through the conducting material 1631 (see FIG. 8) extending from the second transparent substrate 1604 in the thickness direction of the first liquid crystal layer 1616, and the second terminal 1626 is electrically connected to the second transparent electrode 1610 on the second transparent substrate 1604.

The third terminal 1624 is electrically connected to the third transparent electrode 1612 on the second transparent substrate 1604, and the fourth terminal 1630 is electrically connected to the fourth transparent electrode 1614 through the conducting material extending from the second transparent substrate 1604 in the thickness direction of the second liquid crystal 1618.

As shown in FIG. 13(A), the connector 40 has the main body 4002. The main body 4002 has a rectangular connecting surface. On the connecting surface is formed the engaging concave part 4004 along the long side of the rectangle. On one side of the engaging concave part 4004 are formed the first and second connecting pieces 4006 and 4008, and on the other side of the engaging concave part 4004 are formed the third and fourth connecting pieces 4010 and 1012.

The engaging concave part 4004 is constructed such that the projecting part 1604A is detachable and the inserted projecting part 1604A is held. As the projecting part 1604A is inserted into the engaging concave part 4004, the projecting part 1604A is held by the connector 40. This state is kept while electrical connection is made between the first and second terminals 1624 and 1626 of the projecting part 1604A and the first and second connecting pieces 4006 and 4008, and electrical connection is made between the third and fourth terminals 1628 and 1630 of the projecting part 1604A and the third and fourth connecting pieces 4010 and 4021.

The first to fourth connecting pieces 4006, 4008, 4010, and 4012 of the connector 40 are connected to the light control unit 126 (see FIG. 3) through the lead wire 42. While the projecting part 1604A is engaged with the engaging concave part 4004, the drive voltage supplied from the light control unit 126 is applied to the first to fourth transparent electrodes 1608, 1610, 1612, and 1614 through the first to fourth terminals 1624, 1626, 1628, and 1630, respectively.

Example 3 produces the same effect as Example 1. In addition, owing to a plurality of terminals 1624, 1626, 1628, and 1630 formed separately on the first surface 1620 and the second surface 1622 of the projecting part 1604A, it is possible to secure a sufficient area for the individual terminals 1624, 1626, 1628, and 1630 as compared with the case in which all the terminals 1624, 1626, 1628, and 1630 are formed on either of the first surface 1620 and the second surface 1622 of the projecting part 1604A. This is advantageous for stable connection with each connecting piece.

EXAMPLE 4

Figure 14A:
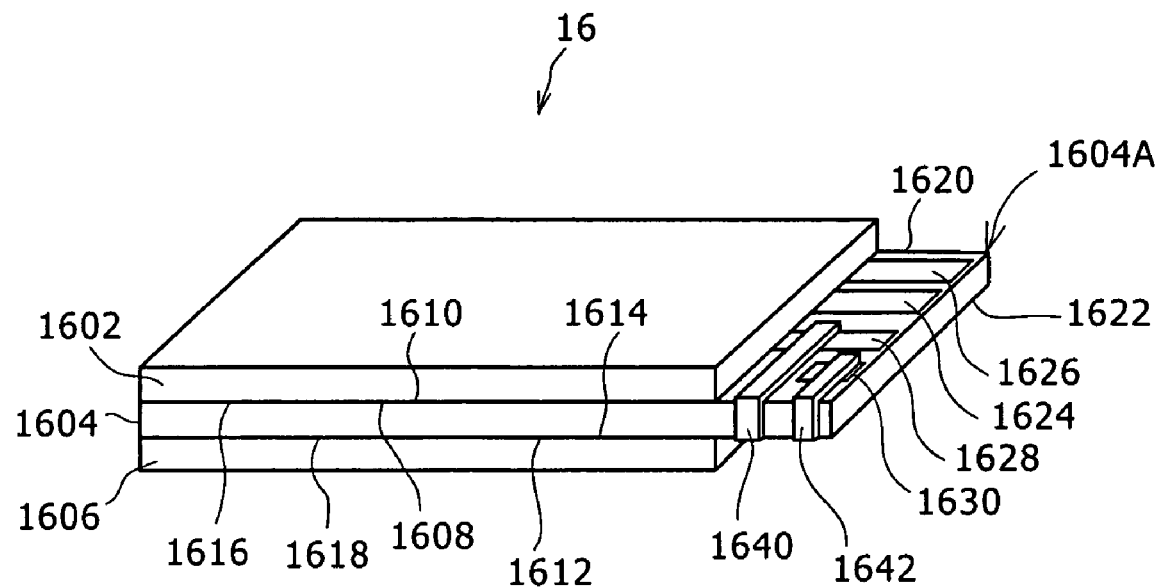
FIGS. 14A and 14B are perspective views showing the liquid crystal light control element 16 pertaining to Example 4.
Figure 14B:
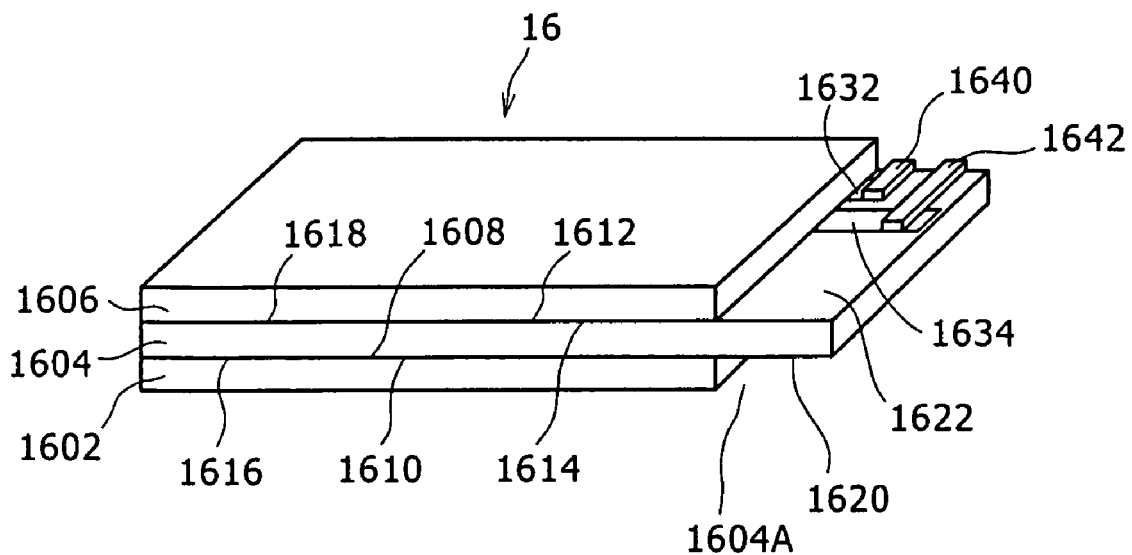

Example 4 differs from Example 1 in the construction by which the terminal is electrically connected to the transparent electrode. FIG. 14(A) is a perspective view of the liquid crystal light control element 16 in Example 4 viewed in its thickness direction from its front. FIG. 14(B) is a perspective view of the liquid crystal light control element 16 viewed in its thickness direction from its rear.

As shown in FIGS. 14(A) and 14(B), the first to fourth terminals 1624, 1626, 1628, and 1630 are formed on the first surface 1620 of the projecting part 1604A.

To be more specific, the first terminal 1624 is electrically connected to the first transparent electrode 1608 through the conducting material 1631 (see FIG. 8) which extends from the second transparent substrate 1604 in the thickness direction of the first liquid crystal layer 1616, and the second terminal 1626 is electrically connected to the second transparent electrode 1610 on the second transparent substrate 1604.

The third terminal 1628 is electrically connected to the third transparent electrode 1612 through the conducting film 1640 and the first intermediate wiring 1632. The conducting film 1640 extends from the first surface 1620 to the second surface 1622 of the projecting part 1604A. In addition, the conducting film 1640 has one end connected to the third terminal 1628 and the other end connected to the first intermediate wiring 1632. The first intermediate wiring 1632 is formed on the second surface 1622 and electrically connected to the third transparent electrode 1612.

The fourth terminal 1630 is electrically connected to the fourth transparent electrode 1614 through the conducting film 1614 (which is different from the conducting film 1640) and the second intermediate wiring 1634. The conducting film 1614 extends over the second surface 1622 from the first surface 1620 of the projecting part 1604A. In addition, the conducting film has one end connected to the fourth terminal 16030 and the other end connected to the second intermediate wiring 1634. The second intermediate wiring 1634 is formed on the second surface 1622. As in FIG. 8, it is electrically connected to the fourth transparent electrode 1614 through the conducting material 1631 which extends from the second transparent substrate 1604 in the thickness direction of the second liquid crystal layer 1618.

The conducting film 1640 is made of a conductive material, such as copper foil, carbon sheet, and organic conductive polymeric film.

Example 4 produces the same effect as Example 1. In Example 4, the third and fourth terminals 1628 and 1630 are electrically connected to the third and fourth transparent electrodes 1612 and 1614 through the conducting films 1640 and 1601. This eliminates the necessity of forming through holes in the projecting part 1604A, which is advantageous in the case where space is limited on the projecting part 1604A, in the case where it is difficult to form through holes on the layout of the terminal, or in the case where the second transparent substrate 1604 is made of a material which presents difficulties in forming through holes.

EXAMPLE 5

Example 5 differs from Example 1 in the construction of the terminal.

Figure 15A:
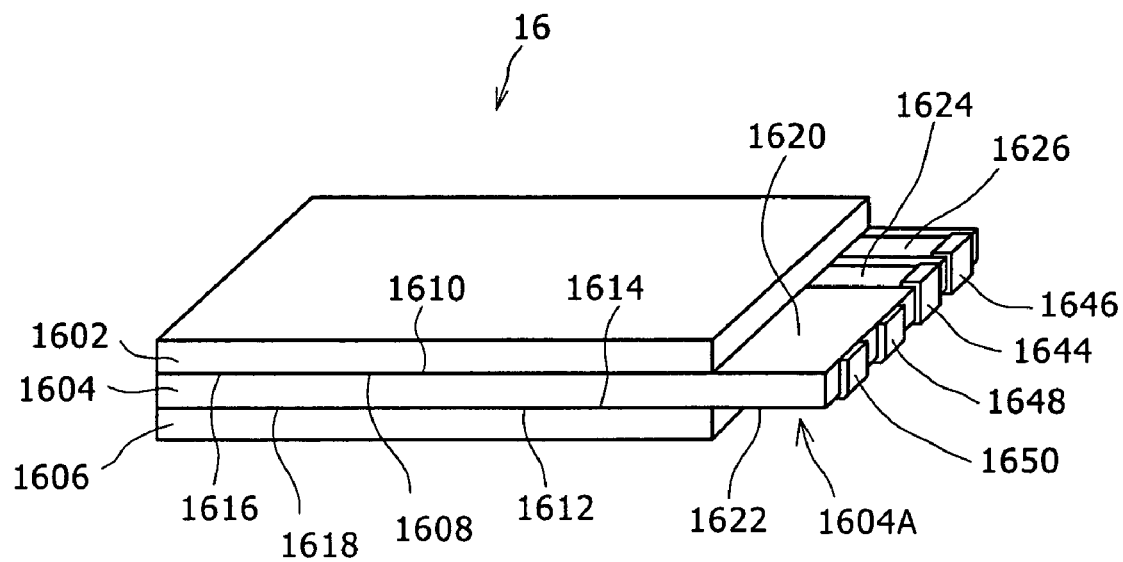
FIGS. 15A and 15B are perspective views showing the liquid crystal light control element 16 pertaining to Example 5.
Figure 15B:
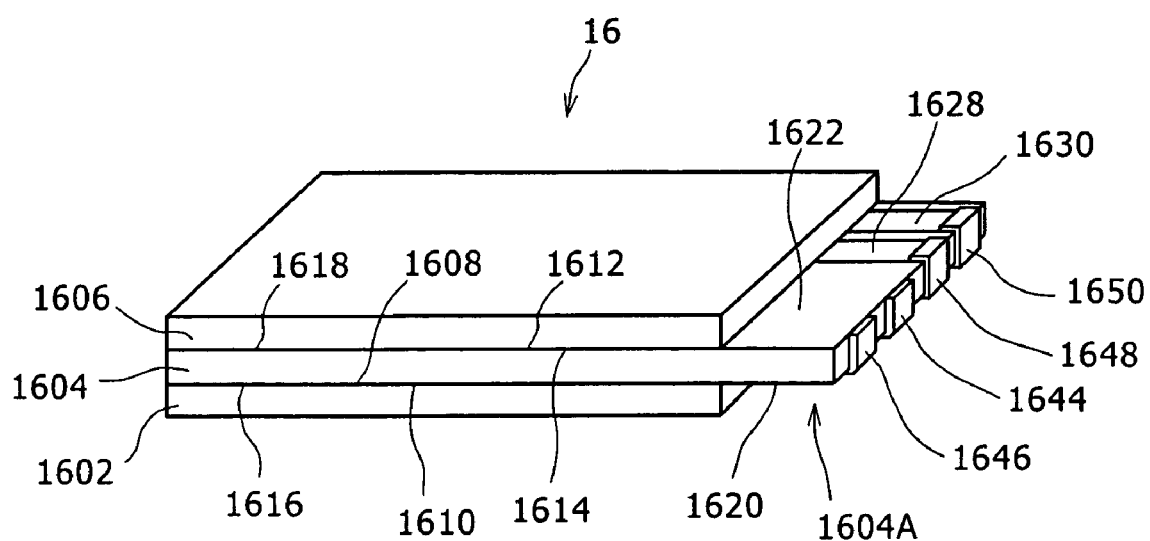

FIG. 15(A) is a perspective view of the liquid crystal light control element 16 in Example 5 viewed in its thickness direction from its front. FIG. 15(B) is a perspective view of the liquid crystal light control element 16 viewed in its thickness direction from its rear.

As shown in FIGS. 15(A) and 15(B), the first terminal 1624 and the second terminal 1626 are formed on the first surface of the projecting part 1604A facing the first transparent substrate 1602, and the third terminal 1628 and the fourth terminal 1630 are formed on the second surface 1622 of the projecting part 1604A facing the third transparent substrate 1606.

Further, the first terminal 1624 is electrically connected to the first transparent electrode 1608 through the conducting material 1631 (see FIG. 8) which extends from the second transparent substrate 1604 in the thickness direction of the first liquid crystal layer 1616, and the second terminal 1626 is electrically connected to the second transparent electrode 1610 on the second transparent substrate 1604.

The third terminal 1624 is electrically connected to the third transparent electrode 1612 on the second transparent substrate 1604, and the fourth terminal 1630 is electrically connected to the fourth transparent electrode 1614 through the conducting material which extends from the second transparent substrate 1604 in the thickness direction of the second liquid crystal layer 1618.

On the end surface of the projecting part 1604A are formed the first to fourth conducting film 1644, 1646, 1648, and 1650.

The first conducting film 1644 extends to the end surface from the first terminal 1624; the second conducting film 1646 extends to the end surface from the second terminal 1626; the third conducting film 1648 extends to the end surface from the third terminal 1626; and the fourth conducting film 1650 extends to the end surface from the fourth terminal 1628.

According to Example 5, connection is made between the first to fourth conducting film 1644, 1646, 1648, and 1650 (which are formed on the end surface of the projecting part 1604A) and the first to fourth terminals 1624, 1626, 1628, and 1630.

Therefore, Example 5 produces the same effect as Example 1. Moreover, according to Example 5, the connecting pieces at the connector side electrically connected to the individual terminals 1624, 1626, 1628, and 1630 are formed such that they are connected to each conducting film 1644, 1646, 1648, and 1650 in the direction perpendicular to the end surface of the projecting part 1604A. This is advantageous to laying out freely the connecting pieces on the connector side.

EXAMPLE 6

Example 6 differs from Example 5 in the arrangement of the conducting film.

Figure 16A:
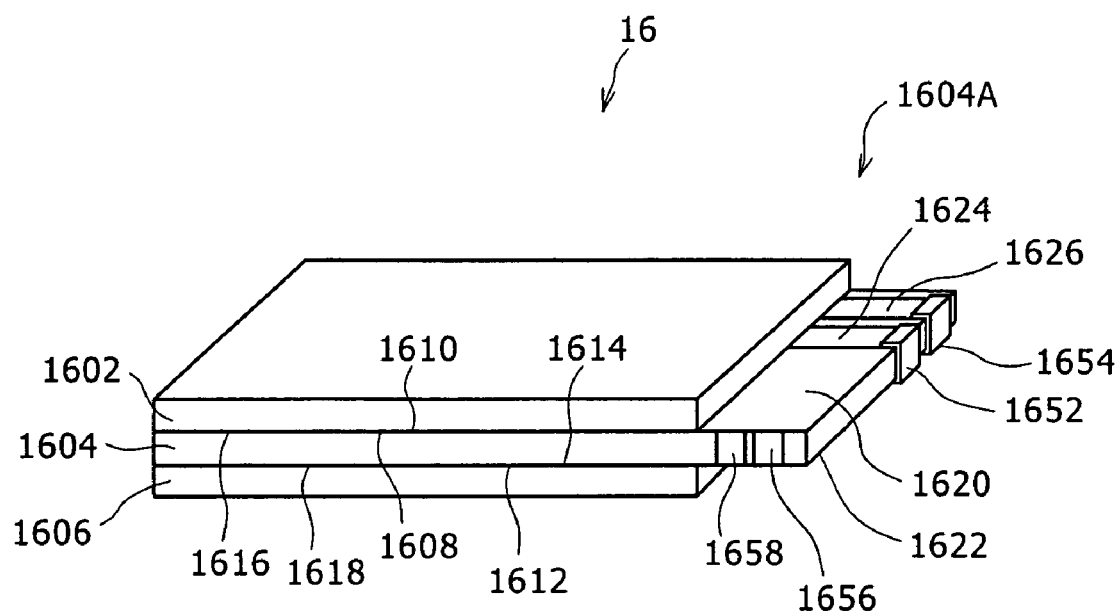
FIGS. 16A and 16B are perspective views showing the liquid crystal light control element 16 pertaining to Example 6.
Figure 16B:
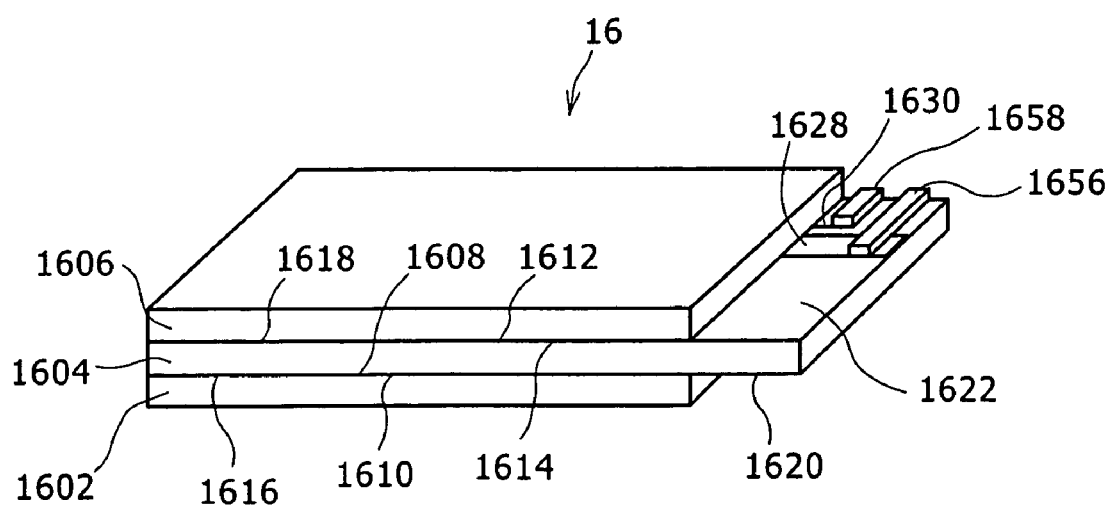

FIG. 16(A) is a perspective view of the liquid crystal light control element 16 in Example 6 viewed in its thickness direction from its front. FIG. 16(B) is a perspective view of the liquid crystal light control element 16 viewed in its thickness direction from its rear.

As shown in FIGS. 16(A) and 16(B), the arrangement of the first to fourth terminals 1624, 1626, 1628, and 1630 is identical with that in Example 5; therefore, its description is omitted here.

On the end surface of the projecting part 1604A are formed the first and second conducting films 1652 and 1654, and on the lateral surface of the projecting part 1604A are formed the third and fourth conducting films 1656 and 1658. The end surface of the projecting part 1604A constitutes one of the short sides of the second transparent substrate 1604, and the lateral surface of the projecting part 1604A constitutes one of the long sides of the second transparent substrate 1604.

The first conducting film 1652 extends to the end surface from the first terminal 1624; the second conducting film 1654 extends to the end surface from the second terminal 1626; the third conducting film 1648 extends to the lateral side from the third terminal 1626; and the fifth conducting film 1656 extends to the lateral side from the fourth terminal 1628.

According to Example 6, connection is made between the first and second conducting films 1652 and 1654 (which are formed on the end surface of the projecting part 1604A) and the first and second terminals 1624 and 1626, and connection is also made between the third and fourth conducting films 1648 and 1665 (which are formed on the lateral side of the projecting part 1604A) and the third and fourth terminals 1628 and 1630.

Therefore, Example 6 produces the same effect as Example 1. Moreover, according to Example 6, the connecting pieces at the connector side electrically connected to the first and second terminals 1624 and 1626 are formed such that they are connected to the first and second conducting films 1652 and 1654 in the direction perpendicular to the end surface of the projecting part 1604A, and the connecting pieces at the connector side electrically connected to the third and fourth terminals 1628 and 1630 are formed such that they are connected to the third and fourth conducting film 1656 and 1658 in the direction perpendicular to the lateral side of the projecting part 1604A. This is advantageous to laying out freely the connecting pieces on the connector side.

EXAMPLE 7

Example 7 differs from Example 1 in the arrangement of the transparent electrode and the conducting part.

Figure 17A:
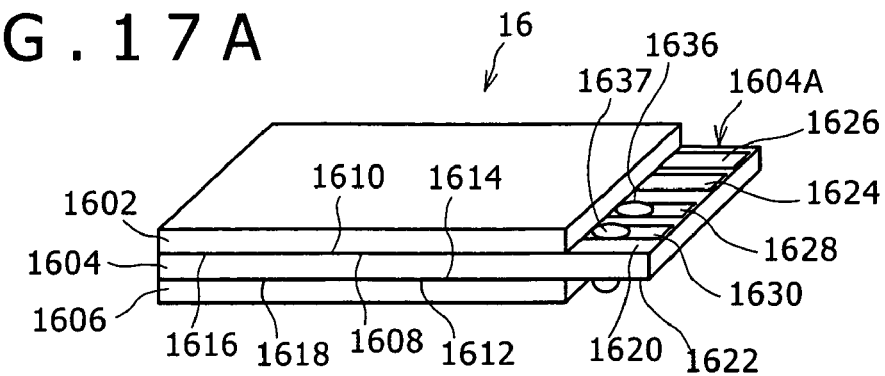
FIGS. 17A to 17D are perspective views showing the liquid crystal light control element 16 pertaining to Example 7 and a plan view showing the first to fourth transparent electrodes.
Figure 17B:
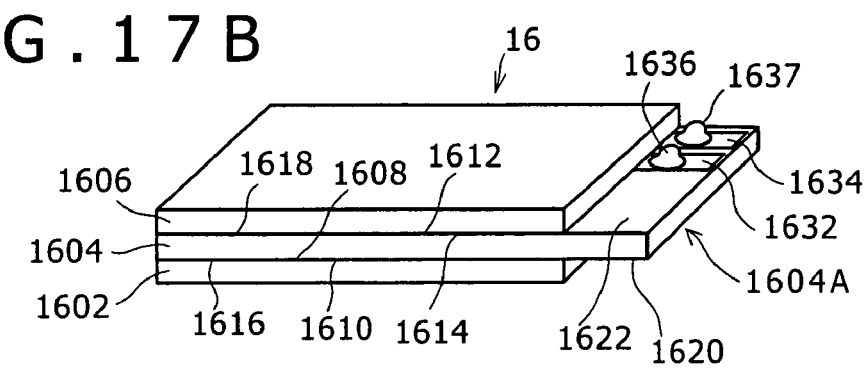
Figure 17C:
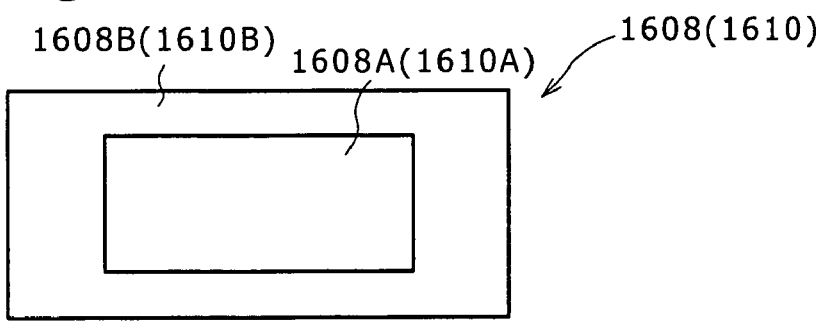
Figure 17D:
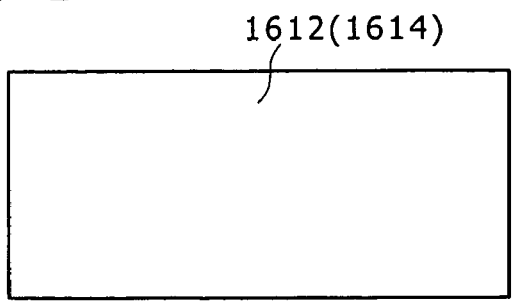

FIG. 17(A) is a perspective view of the liquid crystal light control element 16 in Example 7 viewed in its thickness direction from its front. FIG. 17(B) is a perspective view of the liquid crystal light control element 16 viewed in its thickness direction from its rear. FIG. 17(C) is a plan view of the first and second transparent electrodes. FIG. 17(D) is a plan view of the fourth transparent electrode.

As shown in FIG. 17(A), the first to fourth terminals 1624, 1626, 1628, and 1630 are formed on the first surface 1620 of the projecting part 1604A, and the first and second intermediate wirings 1632 and 1634 are formed on the second surface 1622 of the projecting part 1604A.

As shown in FIG. 17(C), the first transparent electrode 1608 is composed of the first divided transparent electrode 1608A and the second divided transparent electrode 1608B, with the former being positioned at the center of the surface of the first transparent substrate 1602 and assuming a rectangular shape, the latter assuming a rectangular shape which surrounds the periphery of the former.

The second transparent electrode 1610 is composed of the third divided transparent electrode 1610A of the same shape and size as the first divided transparent electrode 1608A which is positioned at the center of the surface of the second transparent substrate 1604, and the fourth divided transparent electrode 1610B of the same shape and size as the second divided transparent electrode 1608B.

As shown in FIG. 17(D), the third transparent electrode 1612 is formed in a rectangle of the same size and shape as the periphery of the first divided transparent electrode 1608.

The fourth transparent electrode 1614 is formed in a rectangle of the same size and shape as the third divided transparent electrode 1612.

Further, as shown in FIG. 17(A), the first terminal 1624 is electrically connected to the first divided transparent electrode 1608A through the conducting material 1631 (see FIG. 8) which extends from the second transparent substrate 1604 in the thickness direction of the first liquid crystal layer 1616, and the second terminal 1626 is electrically connected to the third divided transparent electrode 1610A on the second transparent substrate 1604.

The third terminal 1628 is electrically connected to the second divided transparent electrode 1608B through the conducting material (see FIG. 8) which extends from the second transparent substrate 1604 in the thickness direction of the first liquid crystal layer 1616, and the fourth terminal 1630 is electrically connected to the fourth divided transparent electrode 1610A on the second transparent substrate 1604.

As shown in FIG. 17(B), the first intermediate wiring 1632 is electrically connected to the third transparent electrode 1612 on the second transparent substrate 1604; and the second intermediate wiring 1634 is electrically connected to the fourth transparent electrode 1614 through the conducting material (see FIG. 8) which extends from the second transparent substrate 1604 in the thickness direction of the second liquid crystal layer 1618.

And, the third terminal 1628 is electrically connected to the third transparent electrode 1612 through the conducting material 1636 and the first intermediate wiring 1632. The conducting material 1636 is formed in the through hole which penetrates from the first surface to the second surface of the projecting part 1604A. The conducting material 1636 has one end connected to the third terminal 1628 and the other end connected to the first intermediate wiring 1632.

The fourth terminal 1630 is electrically connected to the fourth transparent electrode 1614 through the conducting material 1637 (which is different from the conducting material 1636) and the second intermediate wiring 1634. The conducting material 1637 is formed in the through hole which penetrates from the first surface to the second surface of the projecting part 1604A. The conducting material 1637 has one end connected to the fourth terminal 1630 and the other end connected to the second intermediate wiring 1634.

According to Example 7, the drive voltage is applied to the first divided transparent electrode 1608A and the third divided transparent electrode 1610A through the first and second terminals 1624 and 1626. Also, the drive voltage is applied commonly to the second divided transparent electrode 1608B, the fourth divided transparent electrode 1610B, the third transparent electrode 1612, and the fourth transparent electrode 1614 through the third and fourth terminals 1628 and 1630.

Therefore, Example 7 produces the same effect as Example 1. Moreover, since the first and second transparent electrodes 1608 and 1610 are divided respectively into the first and second divided transparent electrodes 1608A and 1608B and the third and fourth transparent electrodes 1610A and 1610B, the amount of light passing through the liquid crystal light control element 16 may vary from one part to another depending on the drive voltage applied to individual divided transparent electrodes. This is advantageous to freely setting the light transmittance.

EXAMPLE 8

Example 8 differs from Example 1 in that the number of the transparent substrates is increased by one.

Figure 18:
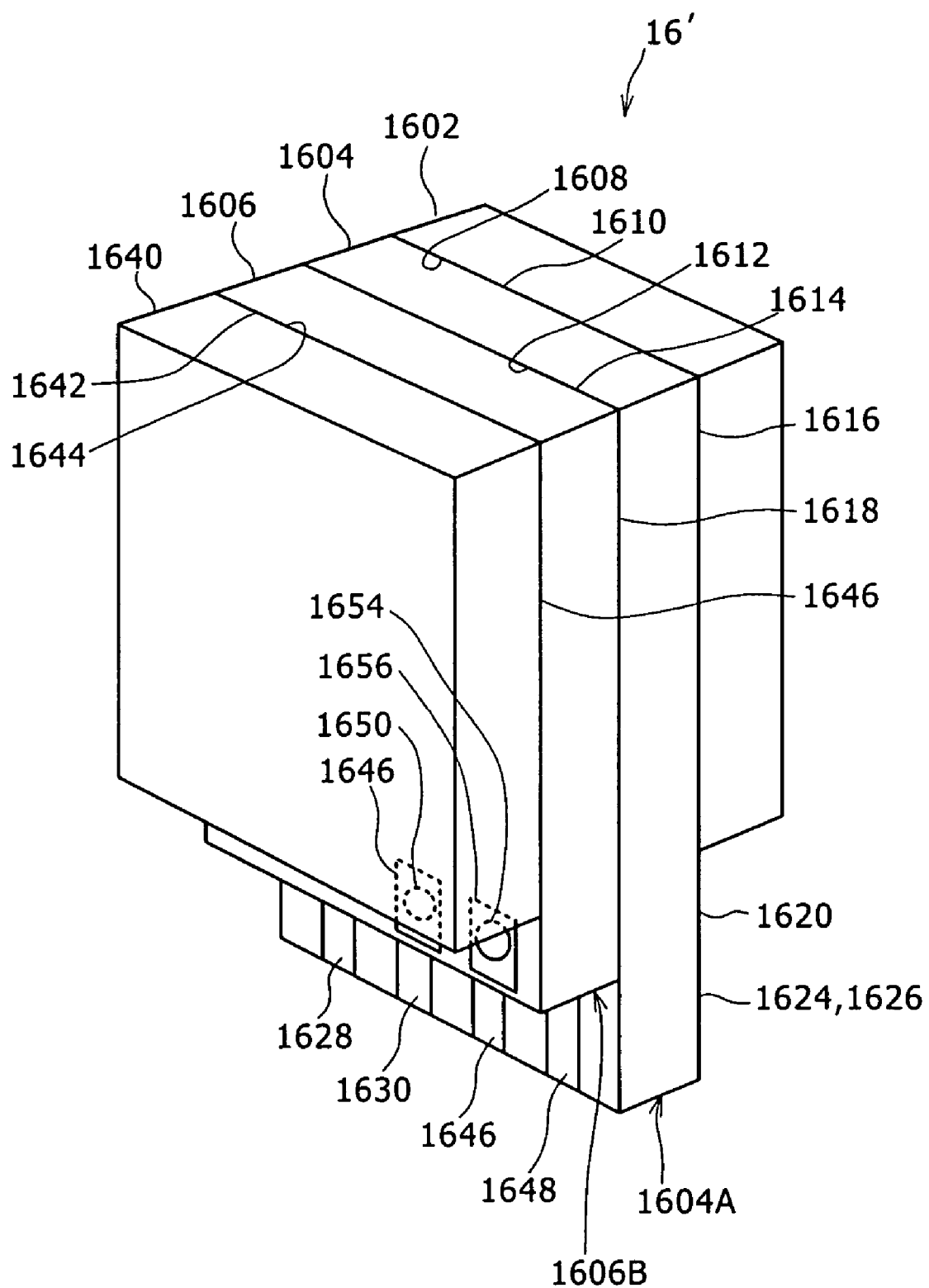
FIG. 18 is a perspective view showing the liquid crystal light control element 16 pertaining to Example 8.

FIG. 18 is a perspective view of the liquid crystal light control element 16 in Example 8.

The liquid crystal light control element 16' is a combination of the liquid crystal light control element 16 (in Example 1) and the fourth transparent substrate 1640.

To be more specific, the fifth and sixth transparent electrodes 1642 and 1644 are formed on the mutually facing surfaces of the third and fourth transparent substrates 1604 and 1640, and the fifth and sixth transparent electrodes 1642 and 1644 face each other.

Between the fifth and sixth transparent electrodes 1642 and 1644 is the third liquid crystal layer 1646. Like the first and second liquid crystal layers 1616 and 1618, the third liquid crystal layer 1646 is constructed such that the amount of light passing in the direction of the thickness of the third liquid crystal layer 1646 (which is the dimension of the gap between the fifth and sixth transparent electrodes 1642 and 1644 facing each other) varies depending on the voltage applied to the fifth and sixth transparent electrodes 1642 and 144. On the opposing surfaces of the fifth and sixth transparent electrodes 1642 and 1644 are formed the fifth and sixth alignment layers. The third liquid crystal layer is sealed between the fifth and sixth alignment layers. The third liquid crystal layer 1646 contains rod-like liquid crystal molecules (see FIG. 5).

A detailed description is given below of the structure of the liquid crystal light control element 16.

The first transparent substrate 1602 and the fourth transparent substrate 1604 assume a rectangle of the same shape and size. The second transparent substrate 1604 assumes a rectangle having a short side equal to the short side of the rectangle and having a long side larger than the long side of the rectangle. The third transparent substrate 1606 assumes a rectangle having a short side equal to the short side of the rectangle of the first and fourth transparent substrates 1602 and 1640 mentioned above and also having a long side larger than the long side of the rectangle of the first and fourth transparent substrates 1602 and 1640 mentioned above and a long side smaller than the long side of the rectangle of the second transparent substrate 1604 mentioned above.

The first transparent substrate 1602 and the second transparent substrate 1604 are bonded together, with the first and second transparent electrodes 1608 and 1610, the first liquid crystal layer 1616, and the first and second alignment layers held one over another between them. In this state, one of the short sides of the first transparent substrate 1602 coincides with the other short side of the second transparent substrate 1604, and the long side of the first transparent substrate 1602 coincides with the long side of the second transparent substrate 1604.

The second transparent substrate 1604 and the third transparent substrate 1606 are bonded together, with the third and fourth transparent electrodes 1612 and 1614, the second liquid crystal layer 1618, and the third and fourth alignment layers held one over another between them. In this state, one of the short sides of the second transparent substrate 1604 coincides with one of the short sides of the third transparent substrate 1606, and the long side of the second transparent substrate 1604 coincides with the long side of the third transparent substrate 1606.

The third transparent substrate 1606 and the fourth transparent substrate 1640 are bonded together, with the fifth and sixth transparent electrodes 1642 and 1644, the third liquid crystal layer 1646, and the fifth and sixth alignment layers held one over another between them. In this state, one of the short sides of the third transparent substrate 1606 coincides with one of the short sides of the fourth transparent substrate 1640, and the long side of the third transparent substrate 1606 coincides with the long side of the fourth transparent substrate 1640.

And, the second transparent substrate 1604 has the projecting part 1604A which projects from the other short side of the first, third, and fourth transparent substrates 1602, 1608, and 1640.

In other words, the second transparent substrate 1604 at the middle in the stacked state has the projecting part 1604A which projects in the direction of the surface of the second transparent substrate 1604 more than the other first, third, and fourth transparent substrates 1602, 1606, and 1640.

The third transparent substrate 1606 at the middle in the stacked state also has the projecting part 1606A which projects in the direction of the surface of the third transparent substrate 1606 more than the other first, and fourth transparent substrates 1602 and 1640.

The projecting part 1604A has the first surface 1620, which faces the first transparent electrode 1608 (the first transparent substrate 1602) and the second surface 1622, which faces the fourth transparent electrode 1614 (the third transparent substrate 1606). On the first surface 1620 are formed, at intervals along the short side of the projecting part 1604A, the first and second terminals 1624 and 1626 which are electrically connected to the first and second transparent electrodes 1608 and 1610. On the second surface 1622 are formed, at intervals along the short side of the projecting part 1604A, the third to sixth terminals 1628, 1630, 1646, and 1648 which are electrically connected to the third to sixth transparent electrodes 1612, 1614, 1642, and 1644. The projecting part 1605A has two through holes which penetrate in its thickness direction, and these through holes have the connecting materials 1650 and 1654 formed therein.

Further, the first terminal 1624 is electrically connected to the first transparent electrode 1608 through the conducting material 1631 which extends from the second transparent substrate 1604 in the thickness direction of the first liquid crystal layer 1616, and the second terminal 1626 is electrically connected to the second transparent electrode 1610 on the second transparent substrate 1604.

The third terminal 1628 is electrically connected to the third transparent electrode 1612 on the second transparent substrate 104, and the fourth terminal 1630 is electrically connected to the fourth transparent electrode 1614 through the conducting material which extends from the second transparent substrate 1604 in the thickness direction of the second liquid crystal layer 1616.

The fifth terminal 1646 is electrically connected to the fifth transparent electrode 1642 through the conducting material 1650 and the first intermediate wiring 1652. The conducting material 1650 has one end connected to the fifth terminal 1646 and the other end connected to the first intermediate wiring 1652. The first intermediate wiring 1652 is electrically connected to the fifth transparent electrode 1642 formed on the surface through which the third transparent substrate 1604 faces the fourth transparent substrate 1640.

The sixth terminal 1648 is electrically connected to the sixth transparent electrode 1644 through the conducting material 1654 and the second intermediate wiring 1656. The conducting material 1654 has one end connected to the sixth terminal 1648 and the other end connected to the second intermediate connecting unit 1656. The second intermediate wiring 1656 is formed on the surface through which the third transparent substrate 1604 faces the fourth transparent substrate 1640. As in FIG. 8, it is electrically connected to the sixth transparent electrode 1644 through the conducting material which extends from the third transparent substrate 1606 in the thickness direction of the fourth liquid crystal layer 1646.

According to Example 7, the drive voltage is applied to the first and second transparent electrodes 1608 and 1610 through the first and second terminals 1624 and 1626, and the drive voltage is also applied to the fourth and fifth transparent electrodes 1612 and 1614 through the third and fourth terminals 1628 and 1630, and the drive voltage is also applied to the fifth and sixth transparent electrodes 1642 and 1644 through the fifth and sixth terminals 1646 and 1648.

Therefore, Example 8 produces the same effect as Example 1. Moreover, since the first to fourth transparent substrates 1602, 1604, 1606, and 1640, the first to sixth transparent electrodes 1608, 1610, 1612, 1614, 1612, and 1614, and the first to third liquid crystal layers 1616, 1618, and 1646 are placed one over another, the light transmittance of the liquid crystal light control element 16 as a whole is the product of the light transmittance through the first liquid crystal layer 1616, the light transmittance through the second liquid crystal layer 1618, and the light transmittance through the third liquid crystal layer 1646. Thus the range of adjustment of the light transmittance can be expanded by the combination of these three sets of light transmittance.

Incidentally, in the above-mentioned examples, it is assumed that the liquid crystal layer is composed of guest-host type cells each containing a host material and a guest material, and the liquid crystal molecules are rod-like ones. However, the material for the liquid crystal layer and the shape of the liquid crystal molecules are not specifically restricted so long as the liquid crystal layer is capable of adjusting the amount of light passing in its thickness direction.

Also, in each example, the liquid crystal light control elements 16 and 16' are shown as the electrical light control element; however, the electrical control element may be one which has a light control layer which is sealed between opposing two transparent electrodes such that it changes the amount of light passing in the direction of gap between the transparent electrodes according to the drive signal applied to these transparent electrodes. An example of such an electrical light control element is an organic electronic luminescent.

Finally, the foregoing examples are mentioned on the assumption that the imaging device is a digital still camera. However, the present invention is apparently applicable to any other imaging devices, such as video camera and television camera, mobile phones with a camera, and electronic machines with a lens barrel.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A lens barrel comprising:

a lens barrel main body that encloses an optical system leading the object image;

an electrical light control element which is arranged on an optical axis of said optical system and supported by said lens barrel main body, said electrical light control element having three or more transparent substrates extending parallel to each other at certain intervals, opposing transparent electrodes formed on opposing surfaces of said transparent substrates, and light control layers each interposed between said opposing transparent electrodes, with said transparent substrates, transparent electrodes, and light control layer being placed on top of each other in a stacked structure, each of said light control layers controlling an amount of light passing in a direction of the thickness of said light control layer that is a dimension of said opposing transparent electrodes, such that said transparent substrate being at an intermediate position in the stacked structure has a projecting part which projects in a surface direction of said transparent substrate from the other transparent substrate, and said projecting part has a plurality of terminals electrically connected to the transparent electrode of each of said transparent substrates; and a connector having an engaging concave part into which said projecting part is inserted and a driving voltage is applied to said transparent electrodes through said terminals, wherein said projecting part of said electrical light control element is accommodated in said connector in a floating manner and said projecting part is relieved from undue force from said connector.

2. The lens barrel according to claim 1, wherein said light control layer is composed of alignment layers formed on the surfaces of said opposing transparent electrodes and a liquid crystal layer interposed between the opposing alignment layers.

3. The lens barrel according to claim 1, wherein the projecting part has terminals formed thereon which are electrically connected to all of the transparent electrodes of all of said transparent substrates.

* * * * *